(12) United States Patent
Ozawa et al.

(10) Patent No.: US 11,435,373 B2
(45) Date of Patent: Sep. 6, 2022

(54) AUTOMATED ANALYZER AND LIQUID DISCHARGE METHOD FOR AUTOMATED ANALYZER

(71) Applicant: HITACHI HIGH-TECH CORPORATION, Tokyo (JP)

(72) Inventors: Satoshi Ozawa, Tokyo (JP); Kunio Harada, Tokyo (JP); Atsushi Kishioka, Tokyo (JP); Haruyoshi Yamamoto, Tokyo (JP); Yu Ishige, Tokyo (JP); Yoshinobu Kohara, Tokyo (JP); Tetsuyoshi Ono, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 627 days.

(21) Appl. No.: 16/475,567

(22) PCT Filed: Oct. 6, 2017

(86) PCT No.: PCT/JP2017/036501
§ 371 (c)(1),
(2) Date: Jul. 2, 2019

(87) PCT Pub. No.: WO2018/135048
PCT Pub. Date: Jul. 26, 2018

(65) Prior Publication Data
US 2021/0132096 A1    May 6, 2021

(30) Foreign Application Priority Data

Jan. 20, 2017 (JP) .............................. JP2017-008090

(51) Int. Cl.
*G01N 35/10* (2006.01)
*G01N 35/02* (2006.01)

(52) U.S. Cl.
CPC ............. *G01N 35/10* (2013.01); *G01N 35/02* (2013.01)

(58) Field of Classification Search
CPC .............................. G01N 35/10; G01N 35/02
See application file for complete search history.

(56) References Cited

U.S. PATENT DOCUMENTS 4,236,988 A    12/1980 Suzuki et al.
6,199,587 B1    3/2001 Shlomi et al.
(Continued)

FOREIGN PATENT DOCUMENTS

JP          S6106938 B2     3/1986
JP          S62106188 A     5/1987
(Continued)

OTHER PUBLICATIONS

Search Report dated Oct. 1, 2020 in corresponding European Application No. 17 892 193.8.
(Continued)

*Primary Examiner* — Suman K Nath
(74) *Attorney, Agent, or Firm* — Miles & Stockbridge, P.C.

(57) ABSTRACT

An automated analyzer includes a plurality of measurement units including a measurement section which measures a sample, a suction container connected to the plurality of measurement units through a first path, a vacuum exhaust system connected to the suction container through a second path, a discharge section connected to the suction container through a third path, a pressure adjustment mechanism disposed in the second path, and a control section which performs control such that the suction container is vacuum-exhausted by the vacuum exhaust system.

11 Claims, 19 Drawing Sheets

(56) References Cited

U.S. PATENT DOCUMENTS

2013/0267933 A1 10/2013 Felber
2017/0010294 A1* 1/2017 Muramatsu ........ G01N 35/1079

FOREIGN PATENT DOCUMENTS

| JP | H06-167504 A | 6/1994 |
| JP | H06-64155 B2 | 9/1994 |
| JP | 2663661 B2 | 10/1997 |
| JP | H11-248025 A | 9/1999 |
| JP | 2001-193862 A | 7/2001 |
| JP | 2015-512308 A | 4/2015 |

OTHER PUBLICATIONS

International Search Report dated Jan. 9, 2018, received in PCT/JP2017/036501.

* cited by examiner

FIG. 11

| Time(sec) | 0 | 1 | 2 | 3 | 4 | 5 |
|---|---|---|---|---|---|---|
| Internal standard liquid measurement | | Introduction of measurement solution 13240 | Discharge of waste liquid 13210 | Washing of dilution tank 13250 | | Measurement 13260 |
| Sample measurement | | Internal standard liquid measurement cycle | | | Discharge of waste liquid 13110 | Dispensing of sample 13120 / Dispensing of diluent 13130 |
| SVA1 (3110) ~Suction/Block | Block | | 1.9 / 2.4 S | | | |
| SVB (1110) V1-V2 Transfer/Close | close | | | 3.5 | 4.6 Washing liquid / 4.7 Transfer | 5.4 close |
| SVD (1220) V2 Vacuum/Leak | leak | | | | 4.3 vacuum | 5.5 leak |
| SVC (1210) V2 discharge/close | close | | | | | |

FIG. 12

| Time(sec) | 0 | 1 | 2 | 3 | 4 | 5 |
|---|---|---|---|---|---|---|
| Sample measurement | | | Sample measurement cycle | | | |
| Internal standard liquid measurement | | Introduction of measurement solution 13140 | Discharge of waste liquid 13110 | Washing of dilution tank 13150 | Discharge of waste liquid 13210 | Measurement 13160 |
| | | | | | | Dispensing of internal standard liquid 13220 |
| SVA1 (3110) ~Suction/Block | | | 1.8 sample 2.4 | 3.5 | Washing liquid 4.6 | |
| | | | Block | | | |
| SVB (1110) V1-V2 Transfer/ Close | | close | | | | |
| SVD (1220) V2 Vacuum/Leak | | leak | | | | |
| SVC (1210) V2 discharge/close | 0.0 discharge | | | | | 5.0 close |

AUTOMATED ANALYZER AND LIQUID DISCHARGE METHOD FOR AUTOMATED ANALYZER

TECHNICAL FIELD

The present disclosure relates to an automated analyzer, a liquid discharge method for an automated analyzer, and a three-way solenoid valve.

BACKGROUND ART

An ion selective electrode (ISE) is widely used as a sensor which measures a concentration of ions (electrolytes) such as potassium, sodium, and chloride in a biological sample represented by blood.

The ISE includes an ion selective sensitive membrane (hereinafter also simply referred to as a "sensitive membrane"), an internal electrolyte solution (hereinafter also simply referred to as an "internal liquid"), and an internal electrode made of silver-silver chloride. A flow cell type ISE includes a flow path for supplying a sample to be measured inside a housing. One surface of the sensitive membrane is in contact with the flow path, and the internal liquid and the internal electrode are provided on another surface side of the sensitive membrane. The flow cell type ISE is used in combination with a flow cell type reference electrode to measure a potential difference generated between the ISE and the reference electrode and determine an activity (concentration) of a target ion.

In the field of clinical examination, it is highly necessary to quantify a concentration of the electrolyte contained in blood which is a biological sample, in particular, a sample such as serum, plasma and urine. These samples may be measured directly using the ISE which is a so-called non-dilution method. In addition, a so-called dilution method may also be performed using the ISE to measure a mixed liquid after adding, mixing and diluting a predetermined amount of diluent to a predetermined amount of sample. Regarding the dilution method, a required amount of a sample liquid is small, a concentration of a coexisting substance such as protein and lipid in the mixed liquid is low, and the influence of contamination due to the coexisting substance is also small. Therefore, the dilution method is characterized in a high stability of the ISE. Therefore, in an automated electrolyte analyzer, a combination of the flow cell type ISE and the dilution method is currently mainstream.

A container called a dilution tank is used to dilute the sample, and the diluted sample prepared in the dilution tank is fed to the flow cell type ISE. An internal standard liquid and the sample are alternately dispensed into the dilution tank, and the internal standard liquid and the sample are alternately measured. A residual sample and the internal standard liquid are removed from the dilution tank by a waste liquid discharge mechanism. After measuring the sample, the dilution tank is washed with pure water or the internal standard liquid. A washing liquid used for washing is also removed by the waste liquid discharge mechanism.

Patent Literature 1 discloses a vacuum waste liquid discharge mechanism in an ISE measuring device. The waste liquid discharge mechanism by an evacuating method is used in fields other than the ISE measuring device. For example, Patent Literature 2 discloses an evacuating device used in an automated analyzer (for example, an enzyme immunoassay device (EIA)).

CONVENTIONAL ART LITERATURE

Patent Literature

PTL 1: JP-B-61-6938
PTL 2: Japanese Patent No. 2663661

SUMMARY OF INVENTION

Technical Problem

Patent Literature 1 does not disclose a method which automatically discards a waste liquid stored in a waste liquid container 8. Therefore, it is necessary to manually discard contents of the waste liquid container 8 when the waste liquid container 8 is full. Since it is necessary to stop the device during this discarding operation, there is a problem that the throughput is low.

In the column of means to solve the problem of Patent Literature 2, it is described that "in the present invention, a primary vacuum container having a suction port and a secondary vacuum container having a drainage port to the atmospheric pressure are connected in series, and the primary vacuum container is always in a vacuum state to enable continuous suction". However, referring to FIG. 8 showing an embodiment, in fact, an on-off valve Vf connected to the primary vacuum container (primary vacuum bottle 2) alternately performs connection to a vacuum pump and to the atmospheric pressure, and the primary vacuum container is not always in the vacuum state. In Patent Literature 2, it is considered that the primary vacuum container is temporarily opened to the atmospheric pressure in consideration of circumstances such as foam generation in the primary vacuum container.

From the above, the description that "the primary vacuum container is always in a vacuum state" in Patent Literature 2 should be appropriately interpreted as "in a vacuum state in many time zones among all time zones of the sequence in FIG. 8" instead of "always in a vacuum state" in a strict sense. In Patent Literature 2, in fact, there is a period in which the primary vacuum container is opened to the atmospheric pressure. In this period, there is a problem that the waste liquid cannot be sucked, and the throughput is low.

Thus, the disclosure provides a technique capable of suctioning the waste liquid at any desired timing by ensuring a vacuum container to be always in a vacuum state.

Solution to Problem

For example, in order to solve the above problems, a configuration described in the claims is adopted. The present application includes a plurality of methods for solving the above problems, and one example thereof provides an automated analyzer that includes: a plurality of measurement units including a measurement section which measures a sample; a suction container connected to the plurality of measurement units through a first path; a vacuum exhaust system connected to the suction container through a second path; a discharge section connected to the suction container through a third path; a pressure adjustment mechanism disposed in the second path; and a control section which performs control such that the suction container is vacuum-exhausted by the vacuum exhaust system.

Another example provides an automated analyzer that includes: a plurality of measurement units including a measurement section which measures a sample; a suction container connected to the plurality of measurement units through a first path; a vacuum exhaust system connected to the suction container through a second path; a discharge section connected to the suction container through a third path; and a control section which performs control such that the suction container is vacuum-exhausted by the vacuum exhaust system when performing measurement in the plurality of measurement units. The control section performs control such that the suction container is vacuum-exhausted at least while vacuum-exhausting the discharge section and while releasing the discharge section to the atmosphere.

Another example provides a liquid discharge method for an automated analyzer which includes a plurality of measurement units including a measurement section that measures a sample, a suction container connected to the plurality of measurement units through a first path, a vacuum exhaust system connected to the suction container through a second path, and a discharge section connected to the suction container through a third path. The waste liquid discharge method includes: a step of vacuum-exhausting the suction container by the vacuum exhaust system; a step of sucking a first waste liquid into the suction container from the measurement units; a step of sucking a second waste liquid into the suction container from the measurement units without releasing the suction container to the atmosphere; and a step of transferring a mixed liquid of the first waste liquid and the second waste liquid in the suction container to the discharge section.

Another example provides a three-way solenoid valve that includes a first port, a second port, and a third port connected to the first port or the second port. The three-way solenoid valve includes a movable section having a first flow path and a second flow path, and a port switch control section including a coil, a magnet, and a movable magnetic core which moves inside the coil and is connected to the movable section. The three-way solenoid valve is configured such that: when an electric current is made to flow through the coil in a first direction, the first port and the third port are connected through the first flow path; when an electric current is made to flow through the coil in a second direction, the second port and the third port are connected through the second flow path; and when an electric current is not made to flow through the coil, the third port is not connected to either of the first port and the second port.

The present description includes the disclosure content of Japanese Patent Application No. 2017-008090, which is the basis for the priority of the present application.

Advantageous Effect

According to the present disclosure, it is possible to suck the waste liquid at an arbitrary timing by ensuring the vacuum container to be always in a vacuum state, and the throughput can be improved. Further characteristics relevant to the disclosure will be apparent based on the description of the present description and attached drawings. Problems, configurations, and effects other than those described above will be apparent based on description of aspects of embodiments hereinafter.

BRIEF DESCRIPTION OF DRAWINGS

FIG. 11 is a time chart of a sample measurement cycle in a waste liquid discharge mechanism of the first embodiment.

FIG. 12 is a time chart of an internal standard liquid measurement cycle in the waste liquid discharge mechanism of the first embodiment.

DESCRIPTION OF EMBODIMENTS

Hereinafter, embodiments of the disclosure will be described with reference to attached drawings. Although the attached drawings show specific embodiments in accordance with principles of the disclosure, they are for the purpose of understanding the disclosure and are not used for limiting the disclosure. In all the drawings for illustrating aspects of the embodiments and examples, those having the same functions are denoted by the same reference signs and repeated description thereof will be omitted.

The following embodiments relate to a device which measures the amount of components contained in a biological sample. The following embodiments are preferably applied to a waste liquid device of an automated analyzer equipped with a plurality of electrolyte analysis units based on ion selective electrodes. The automated analyzer is suitably used alone or as a component of a biochemical automated analyzer so as to perform clinical examination automatically and continuously.

First Embodiment

Figure 1:
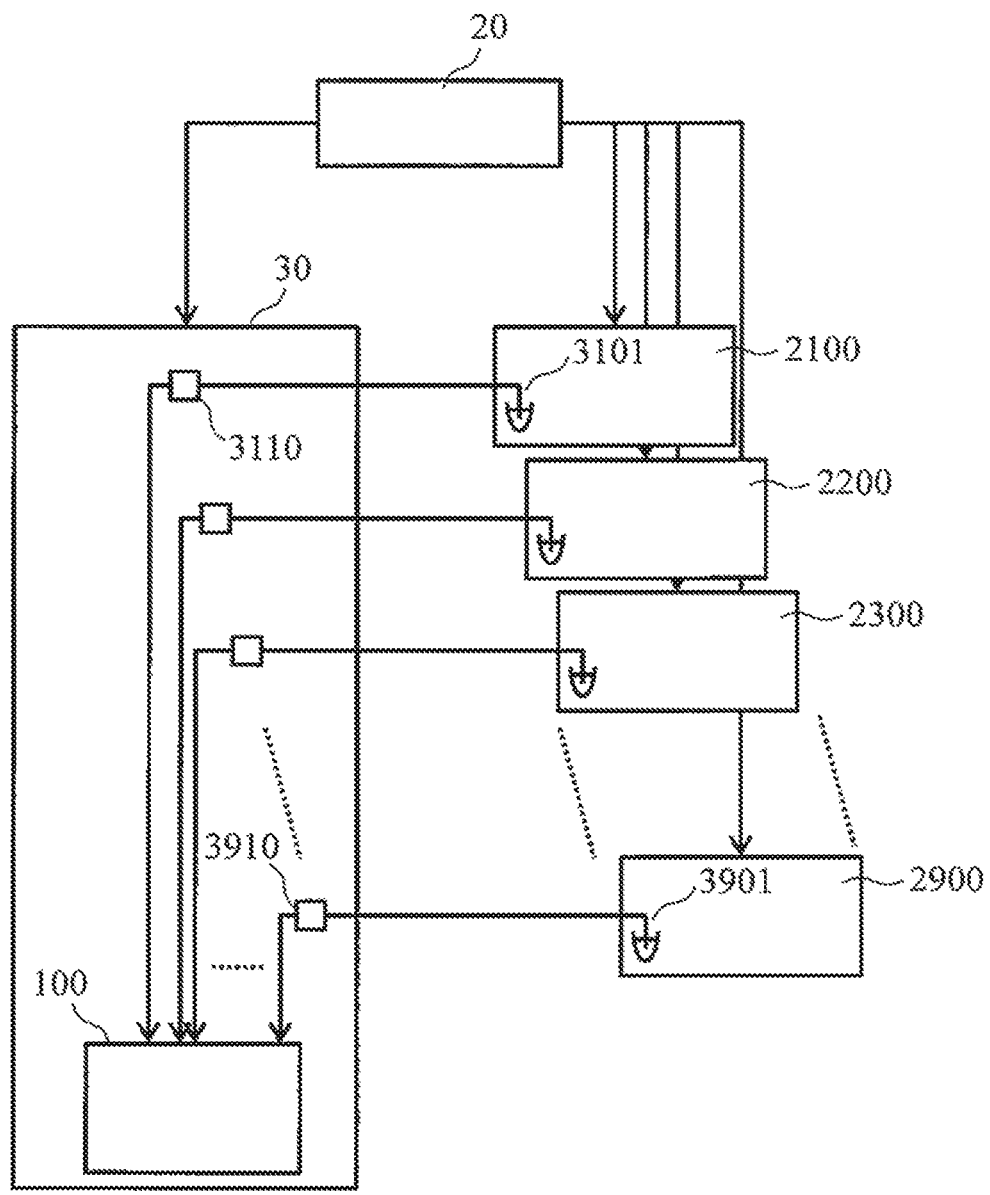
FIG. 1 is a configuration diagram showing an overall configuration of an automated analyzer according to a first embodiment.

FIG. 1 is a schematic view showing a schematic configuration of an automated electrolyte analyzer 10 according to a first embodiment. The automated electrolyte analyzer 10 includes a central control device 20, a waste liquid discharge mechanism 30, and a plurality of electrolyte measurement units 2100, 2200, . . . , 2900. The waste liquid discharge mechanism 30 includes a central portion 100 and a plurality of solenoid valves SVA1 (3110) to SVA9 (3910). Although FIG. 1 illustrates 9 electrolyte measurement units, the number of electrolyte measurement units does not have to be 9, which is generally a natural number, that is, an integer of 1 or more and more preferably a plurality, that is, an integer of 2 or more.

Figure 2:
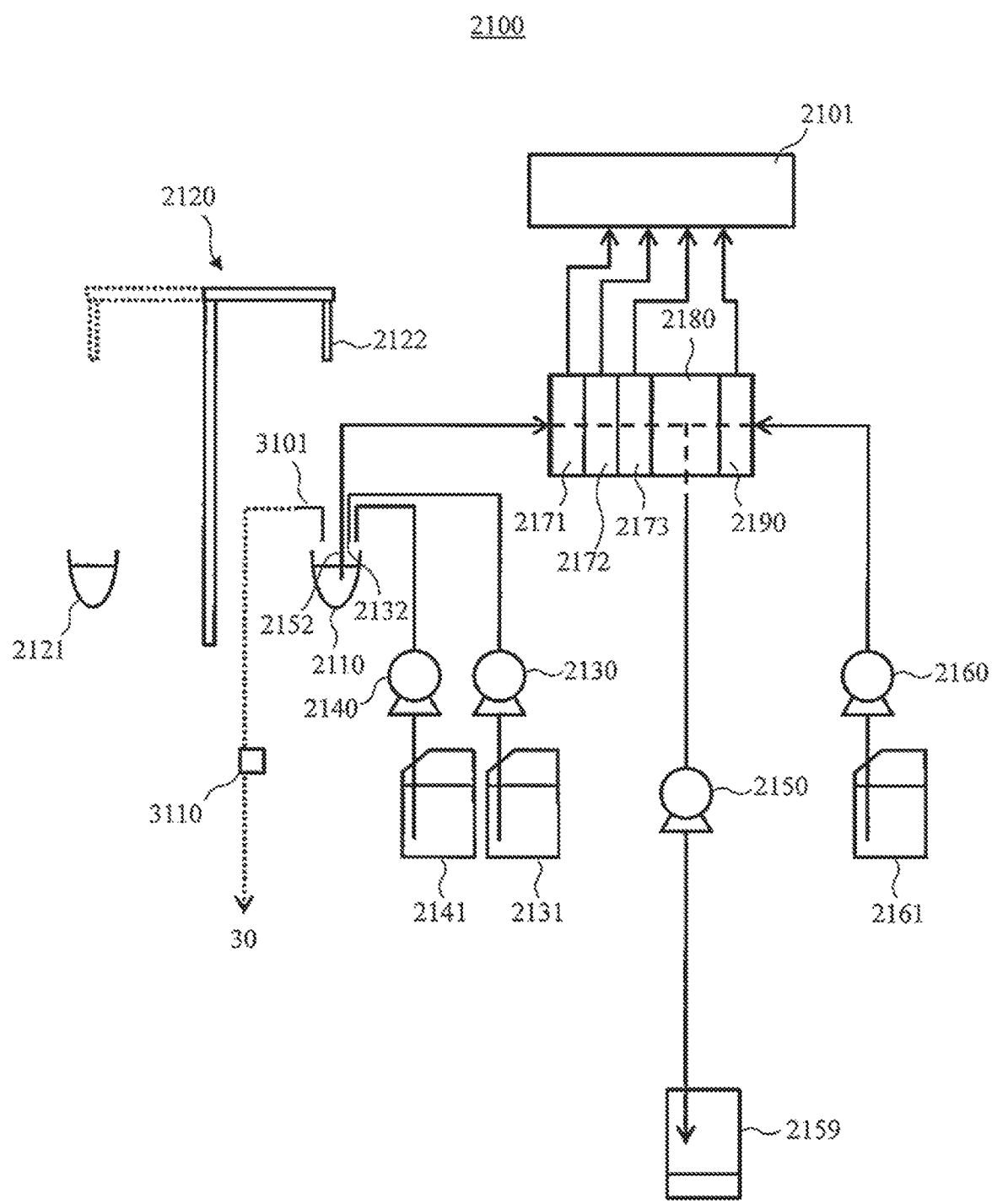
FIG. 2 is a schematic view of an electrolyte measurement unit 2100 according to the first embodiment.

FIG. 2 is a schematic view showing a schematic configuration of the electrolyte measurement unit 2100 according to the first embodiment. Since configurations of electrolyte measurement units 2200, . . . , 2900 are the same as that of the electrolyte measurement unit 2100, the electrolyte measurement unit 2100 will be illustrated hereinafter. The electrolyte measurement unit 2100 includes a measurement section which measures a sample. Specifically, the electrolyte measurement unit 2100 includes a dilution tank 2110, a sample dispensing mechanism 2120, a diluent dispensing mechanism 2130, an internal standard liquid dispensing mechanism 2140, a liquid feeding mechanism 2150, a reference electrode liquid feeding mechanism 2160, a flow cell type Cl-ISE 2171, a flow cell type K-ISE 2172, a flow cell type Na-ISE 2173, a flow cell type liquid junction 2180, a flow cell type reference electrode 2190, a measurement control device 2101, a waste liquid nozzle 3101, and a drive mechanism (not shown) of the waste liquid nozzle 3101. In addition, the electrolyte measurement unit 2100 further includes a container 2121 for sample, a container 2131 for diluent, a container 2141 for internal standard liquid, a container 2161 for reference electrode liquid, and a waste liquid container 2159. As shown in FIG. 2, the waste liquid nozzle 3101 is connected to the waste liquid discharge mechanism 30 through a solenoid valve SVA1 (3110).

Figure 3:
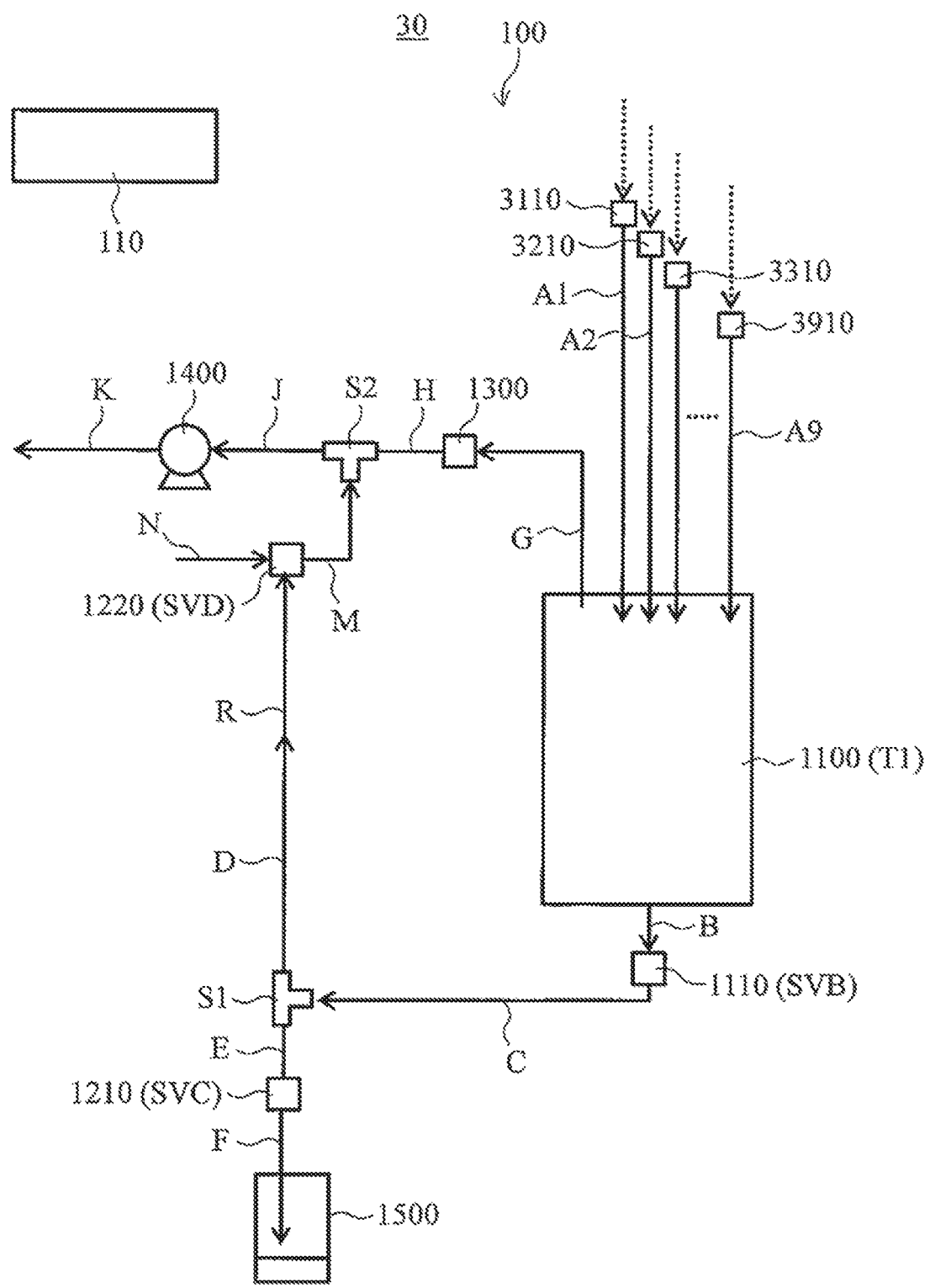
FIG. 3 is a schematic view of a waste liquid discharge mechanism according to the first embodiment.

FIG. 3 is a schematic view of the central portion 100 of the waste liquid discharge mechanism 30 according to the first embodiment. The central portion 100 of the waste liquid discharge mechanism 30 includes a control device 110, a suction container T1 (1100), a pressure adjustment mechanism 1300, a vacuum exhaust system (an exhaust pump 1400), a waste liquid container 1500, a solenoid valve SVB (1110), a solenoid valve SVC (1210), a solenoid valve SVD (1220), solenoid valves SVA1 (3110) to SVA9 (3910), waste liquid flow paths A1 to A9, a transfer flow path B, a transfer flow path C, a transfer and discharge flow path D, a discharge flow path E, a discharge flow path F, an exhaust tube G, an exhaust tube H, an exhaust tube J, an exhaust tube K, an exhaust tube M, a leak tube N, a resistance tube R, a piping joint portion (T-shaped tube) S1, and a piping joint portion (T-shaped tube) S2. The exhaust pump 1400, the solenoid valves SVA1 to SVA9, SVB, SVC, SVD, and in some cases, the pressure adjustment mechanism 1300 include a control wiring (not shown) for connection to the control device 110. The control device 110 can control each component of the central portion 100 described above.

The solenoid valves SVA1 (3110) to SVA9 (3910) are two-way valves, and can control connection/disconnection between the plurality of electrolyte measurement units 2100, 2200, . . . , 2900 and the suction container T. One ends of the solenoid valves SVA1 (3110) to SVA9 (3910) are respectively connected to the waste liquid nozzles 3101, . . . , 3901, and the other ends thereof are air tightly connected to an upper portion of the suction container T1 through the waste liquid flow paths A1 to A9, respectively. The same applies to airtightness of the piping to be evacuated, a connection portion thereof, the container, and the flow path, and the description of the airtightness will be omitted hereinafter.

The suction container T1 is a pressure-resistant container capable of containing a waste liquid inside. The suction container T1 includes a plurality of piping connection ports. The suction container T1 is connected to the waste liquid flow paths A1 to A9, the exhaust tube G, and the transfer flow path B through the plurality of piping connection ports. More specifically, connection portions between the waste liquid flow paths A1 to A9 and the suction container T1 and a connection portion between the exhaust tube G and the suction container T1 are disposed at an uppermost position in a vertical direction. A connection portion between the transfer flow path B and the suction container T1 is disposed at a lowermost position in the vertical direction. In other words, the waste liquid flow paths A1 to A9 and the exhaust tube G are connected to an upper end of the suction container T1, and the transfer flow path B is connected to a lower end of the suction container T1. The same applies to pressure resistance of the piping to be evacuated, a connection portion thereof, the container, and the flow path, and the description of the pressure resistance will be omitted hereinafter.

The transfer flow path B, the transfer flow path C, the transfer and discharge flow path D, the discharge flow path E, the discharge flow path F, and the T-shaped tube S1 include flow paths inside through which the waste liquid can flow. In implementation examples described below, as the transfer flow path B, the transfer flow path C, the transfer and discharge flow path D, the discharge flow path E, and the discharge flow path F, a silicone rubber tube having an inner diameter of 8 mm and an outer diameter of 12 mm was used (adapters having different diameters were used for a part of connection portions). A length of the transfer and discharge flow path D is about 180 mm. The transfer and discharge flow path D provides a space for temporarily storing the waste liquid. An installation height of the transfer and discharge flow path D is preferably lower than an installation height of the suction container T1. The transfer and discharge flow path D, the T-shaped tube S, the discharge flow path E, the solenoid valve SVC, and the discharge flow path F are disposed in this order in a substantially vertical direction. More specifically, a connection portion between the transfer and discharge flow path D and the resistance tube R is disposed at an uppermost position in a vertical direction among these members. The discharge flow path F is disposed at a lowermost position in the vertical direction among these members.

The exhaust tube G, the exhaust tube H, the exhaust tube J, the exhaust tube K, the exhaust tube M, the resistance tube R, and the T-shaped tube S2 include flow paths inside through which a gas can flow. The resistance tube R is characterized in a large flow resistance of the gas in the flow path.

The pressure adjustment mechanism 1300 is capable of adjusting a degree of vacuum. The pressure adjustment mechanism 1300 is, for example, a check valve, a solenoid valve, or a pressure regulator which includes a piping connection port. The exhaust tube G is connected to a suck-in end of the pressure adjustment mechanism 1300.

One end of the exhaust tube H is connected to a suck-out end of the pressure adjustment mechanism 1300. In the implementation examples described below, as the pressure adjustment mechanism 1300, a check valve (PISCO Japan, Ltd. CVPU6-6) having a minimum working differential pressure of 10 kPa or less and a minimum check differential pressure of 40 kPa is used, and a free inflow port side of the check valve is connected to the exhaust tube G, and a free outflow port side of the check valve is connected to one end of the exhaust tube H. A filter (not shown) may be provided between the pressure adjustment mechanism 1300 and the exhaust tube G. Mist may be removed by this configuration. As the pressure adjustment mechanism 1300, a pressure regulator can be adopted in addition to the check valve. In addition, a method of controlling opening and closing of the flow path at an appropriate timing using the control device 110 and the solenoid valve may be adopted, and a method of automating pressure control in combination with a pressure sensor may also be adopted.

The solenoid valve SVB and the solenoid valve SVC are two-way valves. The solenoid valve SVD is a three-way valve. The solenoid valve SVB controls connection/disconnection between the suction container T1 and the transfer and discharge flow path D. The solenoid valve SVC controls connection/disconnection between the transfer and discharge flow path D and the waste liquid container 1500. The solenoid valve SVD can switch between connecting the transfer and discharge flow path D and the exhaust pump 1400 and atmospheric release of the transfer and discharge flow path D. The solenoid valve SVB, the solenoid valve SVC, and the solenoid valve SVD respectively include a piping connection port. One end of the solenoid valve SVB is connected to the transfer flow path B, and the other end of the solenoid valve SVB is connected to the transfer flow path C. One end of the solenoid valve SVC is connected to the discharge flow path E, and the other end of the solenoid valve SVC is connected to the discharge flow path F. A common end of the solenoid valve SVD is connected to the resistance tube R, a normally open end (closed end when energized) of the solenoid valve SVD is connected to the leak tube N, and a normally closed end (open end when energized) of the solenoid valve SVD is connected to the exhaust tube M.

The T-shaped tube S1 is connected to the transfer flow path C, the transfer and discharge flow path D, and the discharge flow path E. The T-shaped tube S2 is connected to the exhaust tube H, the exhaust tube J, and the exhaust tube M. The transfer and discharge flow path D and the resistance tube R are connected through a connector that is not shown.

As the exhaust pump 1400, a diaphragm pump (DAP-6D of Ulvac, Inc.) having a vacuum reachable degree of about −95 kPa and an effective exhaust speed of about 6 L/min was adopted. A suck-in end of the exhaust pump 1400 is connected to the exhaust tube J, and a discharge end of the exhaust pump 1400 is connected to the exhaust tube K. The exhaust tube K includes a filter (not shown), and discharges air in a vacuum system to the atmosphere through the filter. The exhaust pump 1400 may also include a vacuum tank (not shown) at the suck-in end. The vacuum tank functions as a trap for droplets and as a vacuum pressure buffer. The leak tube N includes a filter (not shown), and introduces air into the vacuum system through the filter.

The exhaust pump 1400 and a vacuum system directly connected thereto, that is, the exhaust tube J, the T-shaped tube S2, and the exhaust tubes H and M will be referred to as "V0 line" hereinafter. A vacuum system of the resistance tube R and beyond, which is separated from the V0 line by the solenoid valve SVD, that is, the resistance tube R, the transfer and discharge flow path D, the T-shaped tube S, the transfer flow path C, and the discharge flow path E will be referred to as "V2 line" hereinafter. Meanwhile, a vacuum system of the exhaust tube G and beyond, which is separated from the V0 line by the pressure adjustment mechanism 1300, that is, the exhaust tube G, the suction container T1, the transfer flow path B, and the waste liquid flow paths A1 to A9 will be referred to as "V1 line" hereinafter.

As described above, the waste liquid discharge mechanism 30 is basically an air tightly connected vacuum device. Exceptions of airtightness are the waste liquid nozzles 3101 to 3901, the leak tube N, the exhaust tube K, and the discharge flow path F. The waste liquid nozzles 3101 to 3901, the leak tube N, and the exhaust tube K each has one end released to the atmosphere. The waste liquid in the discharge flow path F falls into the waste liquid container 1500 under atmospheric pressure or a waste liquid drainage (not shown).

Figure 4:
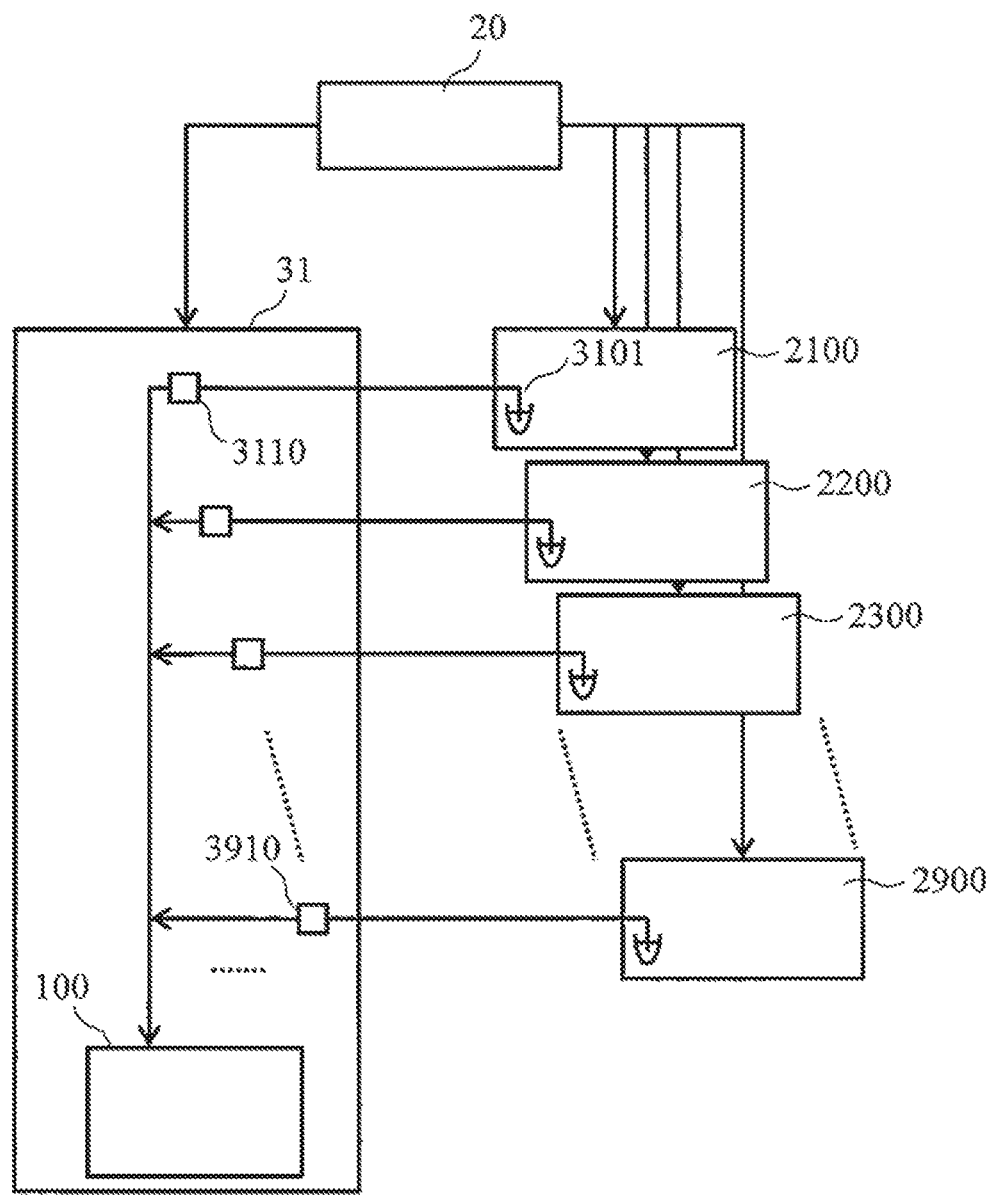
FIG. 4 is a schematic view of an automated analyzer according to a modification of the first embodiment.
Figure 5:
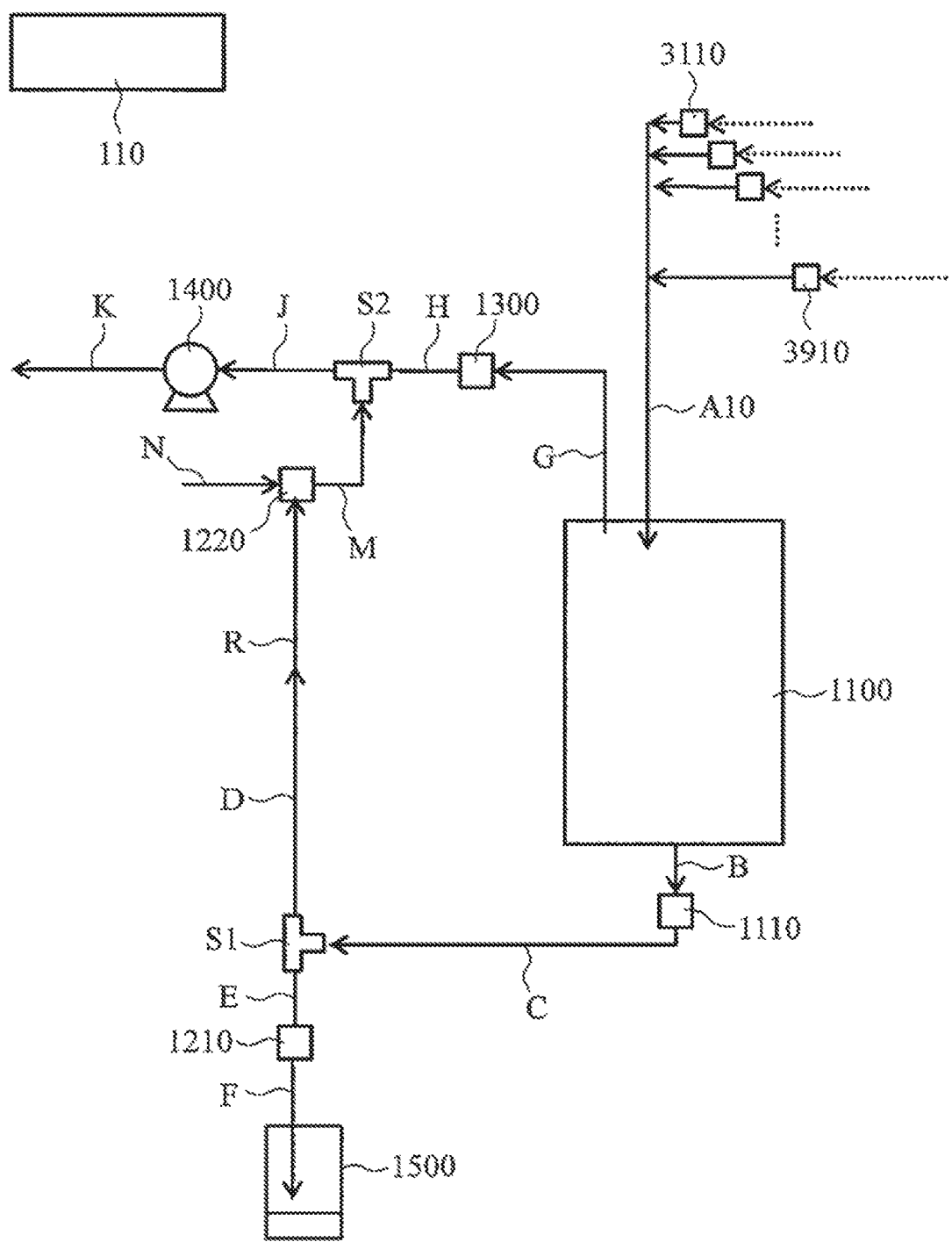
FIG. 5 is a schematic view of a waste liquid discharge mechanism according to a modification of the first embodiment.

A modification of the present embodiment will be illustrated using FIGS. 4 and 5. FIG. 4 is a schematic view showing a schematic configuration of the automated electrolyte analyzer 10 according to a modification of the first embodiment. FIG. 5 is a schematic view of a waste liquid discharge mechanism 31 according to the modification of the first embodiment. In the example of FIGS. 4 and 5, other ends of the solenoid valves SVA1 (3110) to SVA9 (3910) join one waste liquid flow path A10, and one end of the waste liquid flow path A10 is connected to the upper portion of the suction container T1, which is different from configurations in FIGS. 1 and 3.

Figure 6:
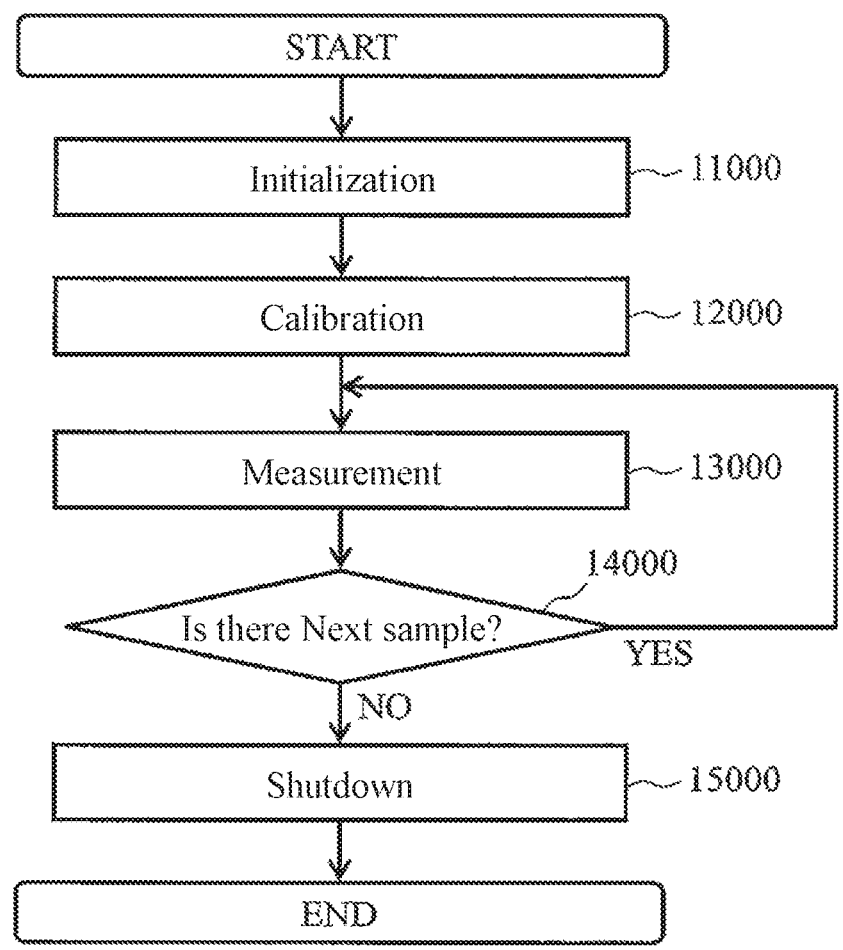
FIG. 6 is a flowchart showing an outline of an operation according to the first embodiment.

Next, an outline of an operation of the present embodiment will be illustrated. FIG. 6 is a flowchart showing an outline of an operation of the electrolyte measurement unit 2100 according to the present embodiment. Although operations of the electrolyte measurement units 2200, . . . , 2900 are the same as those of the electrolyte measurement unit 2100, periodic operations may be out of phase with one another.

After the start, the electrolyte measurement unit 2100 executes an initialization step 11000 and a calibration step 12000, and then repeatedly executes a measurement step 13000 as many as the number of samples. In step 14000, it is determined whether all samples have been measured, and when it is determined that there is no sample to be measured next, a shutdown step 15000 is executed.

The initialization step 11000 includes preparation for the start and washing of each component of the automated electrolyte analyzer. As a part of the initialization, a reference electrode liquid is fed from the container 2161 for reference electrode liquid to the flow cell type liquid junction 2180 through the reference electrode 2190. An internal standard liquid is dispensed from the container 2141 for internal standard liquid into the dilution tank 2110, and the internal standard solution thereof is fed to the flow cell type liquid junction 2180 through the ISEs 2171, 2172, and 2173 to perform conditioning of the ISEs. The initialization step 11000 is ended while the internal standard liquid is left inside the dilution tank 2110.

Figure 7:
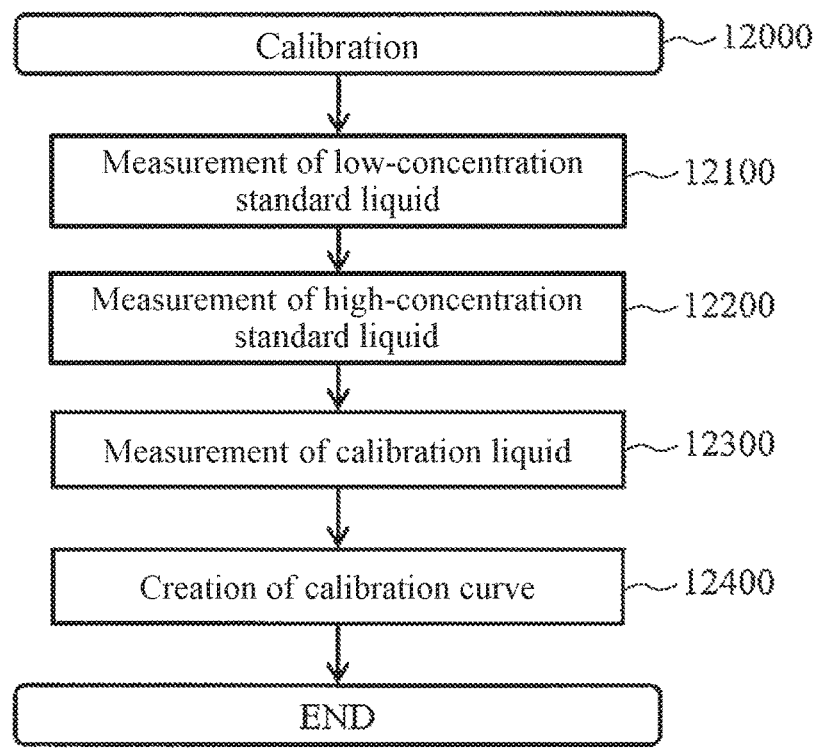
FIG. 7 is a flowchart showing an outline of a calibration step in the first embodiment.

FIG. 7 shows an outline of the calibration step 12000. The calibration step 12000 includes a low-concentration standard liquid measurement step 12100, a high-concentration standard liquid measurement step 12200, a calibration liquid measurement step 12300, and a calibration curve creation step 12400. A measurement procedure of the low-concentration or high-concentration standard liquid and the calibration liquid is in accordance with a measurement step 13000 described below (the standard liquid and the calibration liquid of each concentration is measured in the same manner as the sample, and an electromotive force of each ISE is recorded). The electrolyte measurement unit 2100 determines the slope sensitivity from measurement results of the electromotive force of the standard liquid of two concentrations of high and low in the creation step 12400 of calibration curve. The electrolyte measurement unit 2100 determines the concentration of the internal standard liquid from the slope sensitivity and the electromotive force of the internal standard liquid. In addition, the electrolyte measurement unit 2100 determines a calculated concentration of the calibration liquid from measurement results of electromotive force of the calibration liquid and the slope sensitivity. In addition, the electrolyte measurement unit 2100 determines a shift correction value from the difference between a true concentration (display value) of the calibration liquid and a calculated concentration of the calibration liquid. The slope sensitivity, the concentration of the internal standard liquid and the shift correction value are referred to as the calibration curve.

Figure 8:
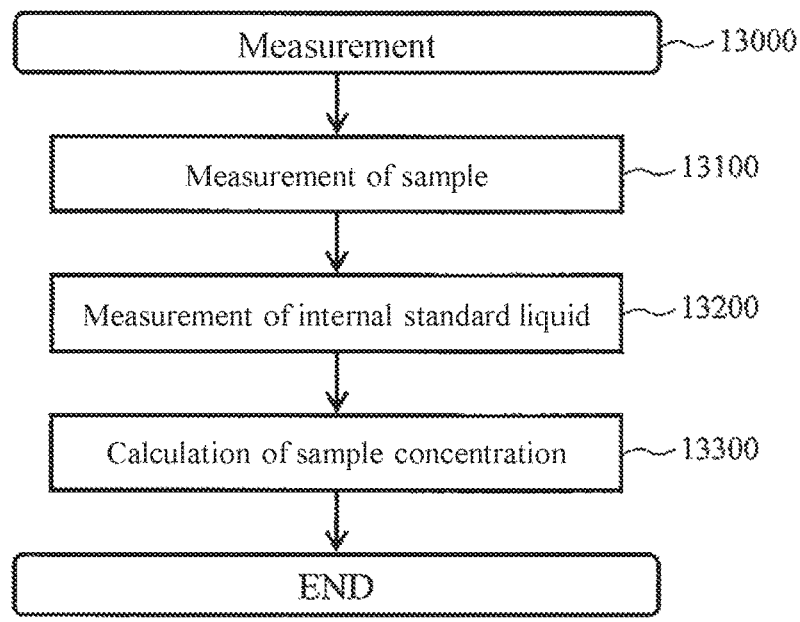
FIG. 8 is a flowchart showing an outline of a measurement step in the first embodiment.

FIG. 8 shows an outline of the measurement step 13000. The measurement step 13000 includes a sample measurement step 13100, an internal standard liquid measurement step 13200, and a sample concentration calculation step 13300.

Figure 9:
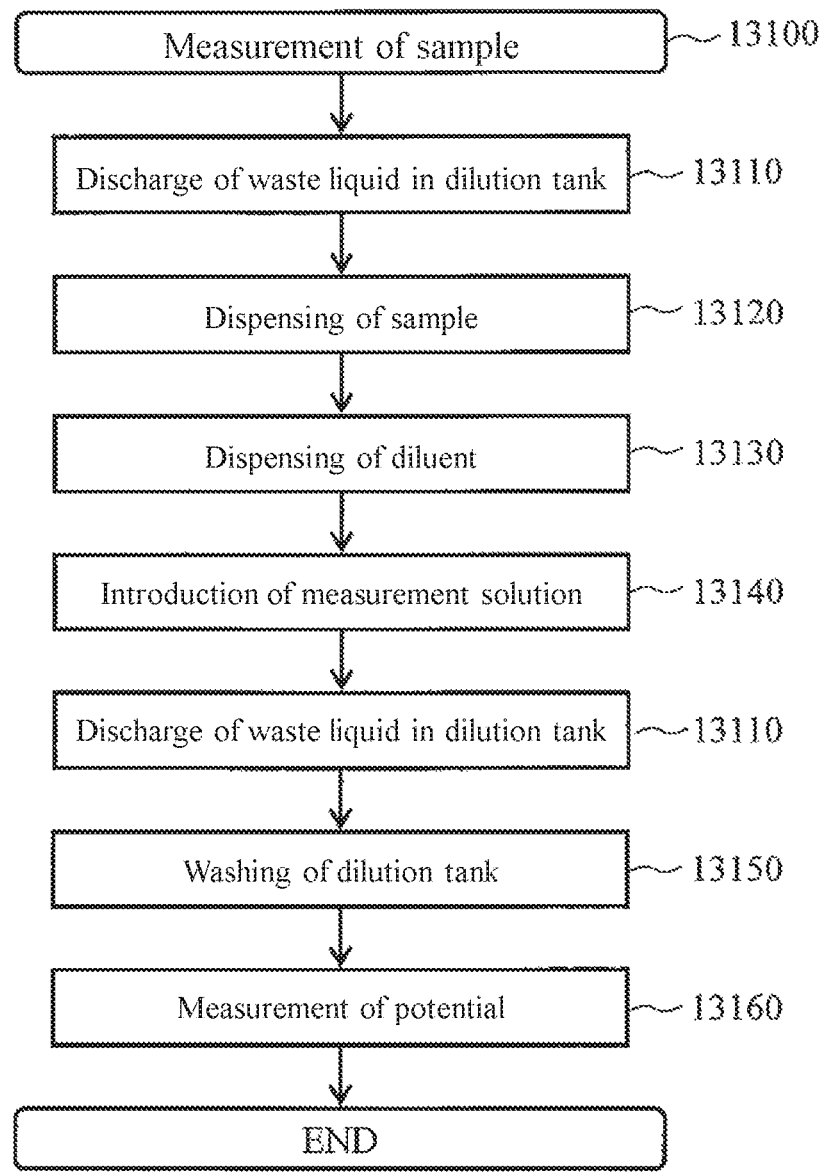
FIG. 9 is a flowchart showing an outline of a sample measurement step in the first embodiment.

FIG. 9 shows an outline of the sample measurement step 13100. The sample measurement step 13100 includes a waste liquid in dilution tank discharge step 13110, a sample dispensing step 13120, a diluent dispensing step 13130, a measurement solution introduction step 13140, a waste liquid in dilution tank discharge step 13110, a dilution tank washing step 13150, and a potential measurement step 13160. Hereinafter, each step of the sample measurement step 13100 will be described in detail.

In the waste liquid in dilution tank discharge step 13110, the control device 110 of the waste liquid discharge mechanism 30 operates the drive mechanism (not shown in FIG. 2) for the waste liquid nozzle 3101 to discharge the liquid (internal standard liquid, diluted sample, system water, etc.) inside the dilution tank 2110. Specifically, before starting this step, the solenoid valve 3110 is closed (in steps other than the waste liquid in dilution tank discharge step, the solenoid valve 3110 is basically closed). In addition, an inside of the waste liquid flow path A1 is evacuated by an action of the waste liquid discharge mechanism 30. Since the solenoid valve 3110 is closed, an inside of the waste liquid nozzle 3101 is maintained at the atmospheric pressure. After the start of the step, the control device 110 drives the drive mechanism for the waste liquid nozzle 3101 to immerse the waste liquid nozzle 3101 in the dilution tank 2110. At the same time, the control device 110 opens the solenoid valve 3110 to provide a vacuum environment through the waste liquid nozzle 3101. The liquid inside the dilution tank 2110 is discharged together with air into the suction container T1 through the waste liquid nozzle 3101 and the solenoid valve 3110. After discharging the liquid only for about one second, the control device 110 closes the solenoid valve 3110 to block the evacuated pressure. Then, the pressure in the waste liquid nozzle 3101 returns to the atmospheric pressure. Last, the control device 110 drives the drive mechanism to dispose a tip section of the waste liquid nozzle 3101 vertically above the dilution tank 2110, that is, out of the dilution tank 2110. A detailed operation of the waste liquid discharge mechanism 30 will be described below.

In the sample dispensing step 13120, the electrolyte measurement unit 2100 uses a sample dispensing nozzle 2122 of the sample dispensing mechanism 2120 to suck a sample (5 μL) from the container 2121 for sample, and discharges the sample while bringing the sample into contact with an inner wall surface of the dilution tank 2110.

In the diluent dispensing step 13130, the electrolyte measurement unit 2100 discharges the diluent (150 μL) from the container 2131 for diluent toward the sample from an obliquely upper position of the dispensed sample through a diluent dispensing nozzle 2132 of the diluent dispensing mechanism 2130. At this time, the diluent spirally swirls along an inner surface of the dilution tank 2110, rolls in the sample and flows into a bottom of the dilution tank 2110 to form a vortex flow. As a result, the sample is diluted with a diluent, and both are uniformly mixed (in other words, discharge stirring is performed). With this step, a diluted sample (155 μL) diluted with a diluent at a predetermined ratio (hereinafter referred to as dilution ratio, 31 times in the present embodiment) can be obtained in the dilution tank 2110. The diluted sample is a kind of sample solution and is hereinafter referred to as a sample solution.

In the measurement solution introduction step 13140, the electrolyte measurement unit 2100 uses a drive mechanism (not shown, a drive device for a vertical direction) for a measurement solution suction nozzle 2152 to immerse the measurement solution suction nozzle 2152 in the sample solution in the dilution tank 2110 (as shown in FIG. 2). In steps other than the measurement solution introduction step 13140, the above drive mechanism basically disposes the measurement solution suction nozzle 2152 above the dilution tank 2110, and brings the measurement solution suction nozzle 2152 out of the dilution tank 2110. The electrolyte measurement unit 2100 controls the liquid feeding mechanism 2150 and the reference electrode liquid feeding mechanism 2160 in conjunction with each other to feed a reference electrode liquid (26 μL) from the container 2161 for reference electrode liquid to the flow cell type liquid junction 2180 through the reference electrode 2190. Next, the electrolyte measurement unit 2100 feeds 145 μL of the sample solution among the sample solution in the dilution tank 2110 as a measurement solution to the flow cell type liquid junction 2180 through the ISEs 2171, 2172, and 2173. Here, the measurement solution and the reference electrode liquid come into contact at a junction of flow paths inside the flow cell type liquid junction 2180 to form a free flow type liquid junction, so that a battery is formed. If necessary, the electrolyte measurement unit 2100 discharges the liquid in the liquid feeding mechanism 2150 to the waste liquid container 2159. After the liquid feeding is ended, the electrolyte measurement unit 2100 uses the drive mechanism for the measurement solution suction nozzle 2152 to pull up the measurement solution suction nozzle 2152 from the dilution tank 2110.

Next, the electrolyte measurement unit 2100 performs the same operation as the waste liquid in the dilution tank discharge step 13110, and wastes the sample solution remaining in the dilution tank 2110.

In the dilution tank washing step 13150, the electrolyte measurement unit 2100 uses a syringe pump (not shown) connected to the sample dispensing nozzle 2122 to dispense 200 uL of system water (pure water) into the dilution tank 2110 through the sample dispensing nozzle 2122, and washes the dilution tank 2110. The pure water may be dispensed into the dilution tank 2110 using a dispensing mechanism or piping dedicated to the pure water. In addition, instead of the system water, the diluent or the internal standard liquid may be dispensed into the dilution tank 2110 in the same manner using the diluent dispensing mechanism 2130 or the internal standard liquid dispensing mechanism 2140. In addition, the diluent, the internal standard liquid, and the system water are dispensed into the dilution tank 2110, and the dilution tank 2110 may be washed by mixing them.

In the potential measurement step 13160, the electrolyte measurement unit 2100 uses a voltage amplifier, an AD converter, a microcomputer, etc. included in the measurement control device 2101 to measure and record each electromotive force for the reference electrode 2190 in the Cl-ISE 2171, the K-ISE 2172, and the Na-ISE 2173.

Figure 10:
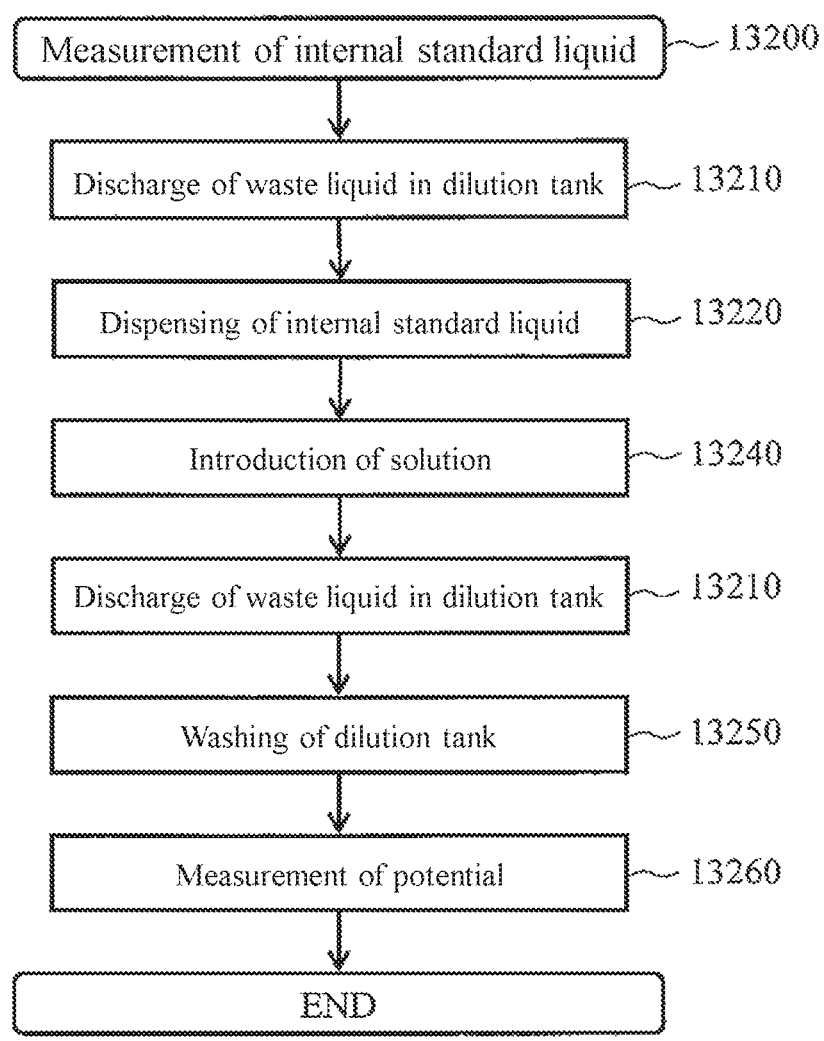
FIG. 10 is a flowchart showing an outline of an internal standard liquid measurement step in the first embodiment.

FIG. 10 shows an outline of the internal standard liquid measurement step 13200. The internal standard liquid measurement step 13200 includes a waste liquid in dilution tank discharge step 13210, an internal standard liquid dispensing step 13220, a measurement solution introduction step 13240, a waste liquid in dilution tank discharge step 13210, a dilution tank washing step 13250, and a potential measurement step 13260. Each step of the internal standard liquid measurement step 13200 is basically the same as the sample measurement step 13100. The internal standard liquid measurement step 13200 is different from the sample measurement step 13100 in that, instead of mixed solution of sample and diluent, 155 µL of internal standard liquid is dispensed into the dilution tank 2110 to make a sample solution, 145 µL of the sample solution is introduced into the ISEs as a measurement solution, and a feeding amount of reference electrode solution is 4 µL instead of 26 µL. Therefore, a detailed description is omitted.

An outline of the sample concentration calculation step 13300 is as follows. In the measurement control device 2101 of the electrolyte measurement unit 2100, a concentration ratio of the sample and internal standard liquid is determined from a difference between the electromotive forces of the diluted sample and of the internal standard liquid for each ISE determined in the potential measurement step 13160 of the sample measurement step 13100 and the potential measurement step 13260 of the internal standard liquid measurement step 13200, the slope sensitivity determined in the calibration curve creation step 12400, and the dilution ratio (here, 31). Then, the measurement control device 2101 determines the concentration of the sample (before shift correction) by multiplying the concentration ratio by a concentration of the internal standard liquid determined in the calibration curve creation step 12400. Still further, the measurement control device 2101 determines the concentration of the sample (after shift correction) by adding a shift correction value to the concentration of the sample. As described above, the measurement control device 2101 determines concentrations of Cl, K, and Na in the sample and reports these concentrations to the user.

After the measurement step 13000, the step 14000 is executed to determine whether all samples have been measured. When all samples have been measured, the shutdown step 15000 is executed. In the shutdown step 15000, washing of various components is performed to prepare a power block. When there is a request for a new sample measurement after the shutdown step 15000, a sample measurement is performed by re-executing the steps from the initialization step 11000. After the measurement step 13000, a waiting time can be provided to wait for arrival of the new sample before the step 14000 is performed.

The above operation is automatically and continuously executed by a program included in the measurement control device 2101.

Next, details of the operation relating to the waste liquid discharge mechanism 30 of the present embodiment will be described using time charts and measurement results of pressure. FIGS. 11 and 12 are time charts when a step related to a continuous measurement of the sample which is the main target of the present device in the operation of the electrolyte measurement unit 2100 in the present embodiment, that is, the measurement step 13000 of FIG. 6 is repeatedly performed. Specifically, it is an example of a time chart relating to components such as a solenoid valve when the sample measurement step 13100 and the internal standard liquid measurement step 13200 in FIG. 8 are alternately and repeatedly performed. FIG. 11 is a time chart of an internal standard liquid measurement cycle. FIG. 12 is a time chart of a sample measurement cycle.

First, the position of the above two steps in the time chart will be described. In fact, the sample measurement step 13100 and the internal standard liquid measurement step 13200 are not respectively completed only within periods of the sample measurement cycle and the internal standard liquid measurement cycle, but are executed while overlapping each other. Thereby, time efficiency can be increased.

For example, a former half step of the sample measurement step 13100 can be performed during a latter half step of the internal standard liquid measurement step 13200, and a former half step of the internal standard liquid measurement step 13200 can be performed during a latter half step of the sample measurement step 13100. In other words, an origin of a time axis in FIGS. 11 and 12 can be selected in any desired manner. In addition, a latter-processing in each step and a former-processing of the next step may be regarded as belonging to any desired steps.

For example, the sample measurement step 13100 and the internal standard liquid measurement step 13200 are started from an intermediate part in FIG. 11. Here, the outline of the operation is described along the time axis of the above-described flowchart, not from the origin of the time chart of FIG. 11.

Next, the overall flow of the time chart will be described. The sample measurement step 13100 was started from a time point of 3.5 seconds in the internal standard liquid measurement cycle of FIG. 11. The waste liquid in dilution tank discharge step 13110 was executed between time points of 3.5 seconds and 4.6 seconds, the sample dispensing step 13120 was executed between time points of 4.6 seconds and 5.2 seconds, and the diluent dispensing step 13130 was executed between time points of 5.2 seconds and 6.0 seconds.

Next, the measurement solution introduction step 13140 was executed between time points of 0.0 second and 1.8 seconds in the sample measurement cycle of FIG. 12, the waste liquid in dilution tank discharge step 13110 was executed between time points of 1.8 seconds and 2.4 seconds, the dilution tank washing step 13150 was executed between time points of 2.4 seconds and 3.5 seconds, and the potential measurement step 13160 was executed between time points of 5.6 seconds and 6.0 seconds.

The internal standard liquid measurement step 13200 is also started from time point of 3.5 seconds in the sample measurement cycle of FIG. 12 in the same manner. The waste liquid in dilution tank discharge step 13210 was executed between time points of 3.5 seconds and 4.6 seconds, and the internal standard liquid dispensing step 13220 was executed between time points of 4.6 seconds and 6.0 seconds. Next, the measurement solution introduction step 13240 was executed between time points of 0.0 second and 1.8 seconds in the internal standard liquid measurement cycle of FIG. 11, the waste liquid in dilution tank discharge step 13210 was executed between time points of 1.8 seconds and 2.4 seconds, the dilution tank washing step 13250 was executed between time points of 2.4 seconds and 3.5 seconds, and the potential measurement step 13260 was executed between time points of 5.6 seconds and 6.0 seconds.

Regarding the waste liquid discharge operation, the V2 line is evacuated from a time point of 4.3 seconds in the internal standard liquid measurement cycle of FIG. 11. Thereafter, the waste liquid is transferred from the suction container T1 to the transfer and discharge flow path D from a time point of 4.7 seconds, and the V2 line was returned to atmospheric pressure again from a time point of 5.5 seconds. In addition, the waste liquid was discharged from the transfer and discharge flow path D to a drain between time points of 0.0 second and 5.0 seconds in the sample measurement cycle of FIG. 12, and the waste liquid discharge operation was completed at a time point of 5.0 seconds.

As described above, the waste liquid in dilution tank discharge steps 13110 and 13210 can be performed in parallel with the transfer or discharge of the waste liquid at the same time.

Next, details of the time chart, in particular, the operation of the solenoid valves, etc., which constitute the waste liquid discharge mechanism 30 which is one of the main components of the present embodiment will be described.

To describe the outline, the control device 110 vacuum-exhausts the V1 line including the suction container T1 and the V2 line including the discharge section (transfer and discharge flow path D) through the V0 line by the vacuum exhaust system (exhaust pump 1400). The control device 110 controls the solenoid valves SVA1 to SVA9 to suck the waste liquid from the dilution tank 2110. The control device 110 connects the discharge section (transfer and discharge flow path D) to the exhaust pump 1400 in parallel with an operation of sucking the waste liquid into the suction container T1. The V2 line including the transfer and discharge flow path D is vacuum-exhausted by the exhaust pump 1400. Next, the control device 110 connects the suction container T1 to the transfer and discharge flow path D to control the waste liquid to be transferred to the transfer and discharge flow path D. After transferring the waste liquid to the transfer and discharge flow path D, connections between the suction container T1 and the transfer and discharge flow path D, and between the exhaust pump 1400 and the transfer and discharge flow path D are blocked by the control device 110. The transfer and discharge flow path D (V2 line) is released to the atmosphere while maintaining the evacuated pressure of the suction container T1 (V1 line).

In the initialization step 11000 which is not shown in the time charts of FIGS. 11 and 12, the solenoid valves SVA1 to SVA9 are not energized (closed, non-suction mode), the solenoid valve SVB is not energized (closed, non-transfer mode), the solenoid valve SVC is not energized (closed, non-discharge mode), and the solenoid valve SVD is energized (the resistance tube R and the exhaust tube M are connected to each other, vacuum mode). When the exhaust pump 1400 is operated, air in the exhaust tube J is discharged out of the system (that is, to the atmosphere) through the exhaust tube K, and other piping and components in the same system of the T-shaped tube S2 and beyond (exhaust tubes H and M, that is, in an inside of the above-described V0 line) is evacuated in the same manner. The V2 line such as the transfer and discharge flow path D and the transfer flow path C is also evacuated slightly later than the V0 line by an action of the resistance tube R through the solenoid valve SVD. Meanwhile, the V1 line of the exhaust tube G and beyond, that is, the exhaust tube G, the suction container T1, the transfer flow path B, and the waste liquid flow paths A1 to A9, is also evacuated through the pressure adjustment mechanism 1300 (check valve). Since the check valve adopted in the present embodiment has a pressure loss of about 10 kPa, when comparing a pressure P1 of the V1 line with a pressure P0 of the V0 line, the pressure P1 of the V1 line is higher than the pressure P0 of the V0 line only by this pressure loss (that is, P1>P0).

About 1 second after starting the evacuation and when the pressure in the system is almost stabilized, the waste liquid possibly remaining in the suction container T1 is discharged. The waste liquid discharge operation will be described below. By repeating the waste liquid discharge operation as many times as necessary, all the waste liquid possibly remaining in the suction container T1 is discharged.

About 1 minute after starting the waste liquid discharge and when all waste liquid discharge is completed, energization of the solenoid valve SVD is stopped (the resistance tube R and the leak tube N are connected, leak mode), and the V2 line is released to the atmospheric pressure. Here, only the V2 line is released to the atmospheric pressure, and the evacuated pressure in the V1 line or the V0 line is maintained.

As described above, when the initialization step of the waste liquid discharge mechanism 30 is completed, the V0 line reaches a degree of vacuum of about −95 kPa (gauge pressure, hereinafter the same).

Figure 13:
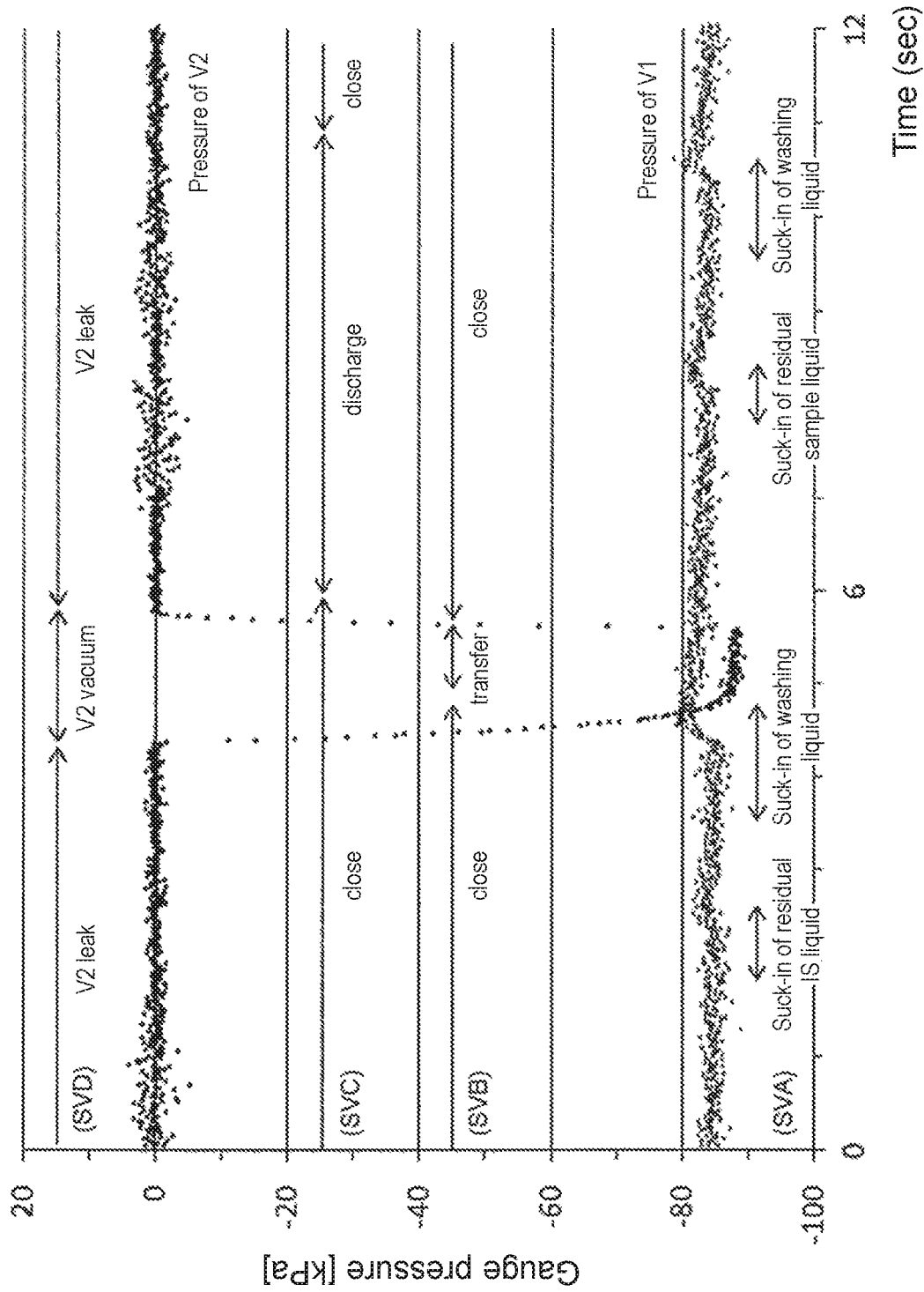
FIG. 13 shows measurement results of a pressure in the waste liquid discharge mechanism in the sample measurement step and the internal standard liquid measurement step of the first embodiment.

FIG. 13 shows a measurement result of pressure of V1 and V2 lines in the waste liquid discharge mechanism 30 according to the present embodiment. As shown at the time point of 0.0 second in FIG. 13, the pressure of the V1 line is about −85 kPa, and the pressure of the V2 line is about 0 Kpa (atmospheric pressure). At this time, the solenoid valves SVA1 to SVA9 are closed (non-suction mode), the solenoid valve SVB is closed (non-transfer mode), the solenoid valve SVC is closed (non-discharge mode), and the solenoid valve SVD is connected to the leak tube N (leak mode).

In the measurement solution introduction step 13240 at the start time of the internal standard liquid measurement cycle of FIG. 11, which is t=0.0 to 1.9 (unit: second, hereinafter the same), the internal standard liquid dispensed into the dilution tank 2110 is introduced into a flow path of the ISEs. In the waste liquid in dilution tank discharge step 13210 at t=1.8, the solenoid valves SVA1 to SVA9 become open (suction mode). Here, an example in which the solenoid valve SVA1 is opened will be described. In this case, a high vacuum state of about −85 kPa in the V1 line is directly provided to the waste liquid nozzle 3101, and the liquid inside the dilution tank 2110 (such as the remainder of the internal standard liquid not introduced to the ISEs) is sucked into the suction container T1 through the waste liquid nozzle 3101, the solenoid valve SVA1 and the waste liquid flow path A1. As described above, when a predetermined measurement unit among the plurality of electrolyte measurement units 2100, 2200, . . . , 2900 is connected to the waste liquid flow path A1 through the solenoid valve SVA1, the control device 110 may close the solenoid valves SVA2 to SVA9 that connect the other measurement units among the plurality of electrolyte measurement units 2100, 2200, . . . , 2900 and the waste liquid flow paths A2 to A9, in other words, control them to be out of phases of each other.

At t=2.4, the solenoid valve SVA1 becomes closed and returned to the non-suction mode, and the suck-in is stopped (hereinafter, the description when returning to an original state is omitted).

At t=2.4 to 3.5 in the dilution tank washing step 13250, the system water is injected into the dilution tank 2110 for washing.

At t=3.5 to 4.6 in the waste liquid in dilution tank discharge step 13110, the remainder of the washing liquid inside the dilution tank 2110, etc., is sucked into the suction container T1, which is the same as that in the waste liquid in dilution tank discharge step 13210.

At t=4.6 to 5.2 in the sample dispensing step 13120, the sample is dispensed into the dilution tank 2110.

At t=5.2 to 6.0 in the diluent dispensing step 13130, the diluent is injected into the dilution tank 2110, and the sample is diluted by discharge stirring to prepare a measurement solution of the sample.

At t=5.6 to 6.0 in the potential measurement step 13260, the ISEs are used to measure potentials of the internal standard liquid.

In parallel with the above waste liquid suction operation, the waste liquid discharge operation is performed. Specifically, the solenoid valve SVD is energized at t=4.3 and after in FIG. 11, and the resistance tube R is connected to the exhaust tube M (V2 vacuum mode). Then, as shown in FIG. 13, evacuation of the V2 line is started. Air flowing from the resistance tube R into the exhaust tube M flows not only into the exhaust tube J or the exhaust pump 1400 through the T-shaped tube S2, but also flows back to the exhaust tube H. The slight rise in the V1 pressure seen in a vicinity of about 4.4 seconds in FIG. 13 is considered to be caused by this flowing-back. When this flowing-back continues, the pressure of the V0 line becomes higher than that of the V1 line. When a differential pressure exceeds the check differential pressure of the pressure adjustment mechanism 1300 (check valve), the check valve is closed. Therefore, there is no problem that further air flows back from the exhaust tube H to the exhaust tube G to destroy the evacuation of the V1 line.

In the present embodiment, as shown in FIG. 13, the pressure P1 of the V1 line when the pressure adjustment mechanism 1300 (check valve) was closed was about −80 kPa, and it was possible to keep the slight rise as small as negligible, which is about 5 kPa before the flowing-back. That is, with an action of the pressure adjustment mechanism 1300 (check valve), there is an effect that the vacuum is maintained with almost no loss of the degree of vacuum of the V1 line. The control device 110 performs control such that when the V2 line is vacuum-exhausted in the waste liquid discharge operation, air pressure in the V2 line is lower than air pressure in the suction container T1. As shown in FIG. 13, after the start of evacuation, a degree of evacuation in the V2 (and V0) system is further increased as time goes on. The pressure P2 of the V2 line is balanced with the pressure P1 of the V1 line at t=about 4.6. Further, it reaches about −90 kPa at t=about 4.7, that is, P2<P1.

The pressure P0 of the V0 line decreases in conjunction with evacuation of V2. At a stage where P0 is sufficiently lower than the pressure P1 of the V1 line, the pressure adjustment mechanism 1300 (check valve) is opened as described above, and exhaust from the exhaust tube G to the exhaust tube H is started. When comparing P1 with P0, P1 is higher than P0 by the pressure loss of the check valve. That is, the pressure of the V1 line converges toward about −85 kPa.

From t=4.7 on, the solenoid valve SVB is opened (transfer mode). Then, as a result of the waste liquid suction operation (4 times when in a continuous cycle) before this, the waste liquid accumulated inside the suction container T1 is transferred to the transfer flow path B, the solenoid valve SVB, the transfer flow path C, and the transfer and discharge flow path D by a pressure difference (P1-P2, hereinafter referred to as ΔP) between the V1 line and the V2 line as described above as a driving force. Since ΔP is relatively large at about 8 kPa as shown in FIG. 13, there is an effect that even if there are obstacles such as air bubbles in the intermediate part of the flow path, they are transferred together with the waste liquid, and there is no risk of causing problems such as clogging. In addition, the flow rate of the gas from the transfer and discharge flow path D to the resistance tube R is controlled by an action of the resistance tube R, and therefore the flow rate of the waste liquid is also controlled. Therefore, the waste liquid will rise inside the transfer and discharge flow path D at a linear velocity that is not too high. By closing the solenoid valve SVB (non-transfer mode) at an appropriate timing, that is, at t=5.4 in the present embodiment, the waste liquid is kept inside the transfer and discharge flow path D. Therefore, there is an effect that there is no risk that the waste liquid is mixed into the V0 line such as the resistance tube R or the solenoid valve SVD.

The waste liquid can be transferred stronger as the ΔP (=P1-P2) becomes larger, which has the effect of easily avoiding problems such as clogging. Here, when a lower limit of P2 is complete vacuum, it is 0 kPa in absolute pressure and about −101.325 kPa in gauge pressure. In other words, a theoretical upper limit of ΔP can be expressed as about P1+101 (in gauge pressure; same hereinafter). In reality, the lower limit of P2 is defined by the pressure P0 of the V0 line, and P0 is defined by the performance of the exhaust pump 1400. For example, in a case of the exhaust pump 1400 adopted in the present embodiment, since a lower limit value of the vacuum reachable degree, that is, P0 is about −95 kPa, a practical upper limit of ΔP is about P1+95. Meanwhile, since the waste liquid suction capacity (from the dilution tank to the suction container T1) is higher as the P1 becomes lower, it is generally preferable to set P1 as low as possible. However, when P1 is made too low (when P0 and P2 are fixed), there is a risk that ΔP cannot be ensured sufficiently. In the present embodiment, P1 was set in a range of about −80 kPa to −85 kPa from the viewpoint of waste liquid suction capability, the pressure difference ΔP necessary for a waste liquid transfer was set as about 8 kPa, P2 was determined to be −93 kPa or less required for this, and the DAP-6D of Ulvac, Inc. having a rating of about −95 kPa equivalent to P0 was adopted as an exhaust pump that satisfies this requirement.

In general, a design procedure can be taken such that, P1 is set as required in the viewpoint of waste liquid suction capability, the pressure difference ΔP necessary for the waste liquid transfer is set, P2 is determined, and then lastly, an exhaust pump 1400 having P0 lower than P2 is selected in consideration of cost performance, occupied volume, waste heat, and power consumption.

As the pressure difference ΔP for waste liquid transfer, about 8 kPa satisfied the requirement as described above in the combination of the solenoid valves and the piping adopted in the present embodiment, and the performance balance was good. In general, ΔP can be adopted from about 1 kPa to 30 kPa, more preferably from about 3 kPa to 15 Kpa, and even more preferably from about 5 kPa to 10 Kpa.

From t=5.5 on, the solenoid valve SVD becomes not energized (leak mode). Then, air flows in from the leak tube N, and the V2 line returns to atmospheric pressure, i.e. the solenoid valve SVD and the resistance tube R, and slightly later the transfer and discharge flow path D, the transfer flow path C, and the discharge flow path E. However, the V1 line and the V0 line maintain the vacuum state.

At t=0.0 in the sample measurement cycle of FIG. 12, the solenoid valve SVC becomes open (discharge mode). Then, the waste liquid inside the transfer and discharge flow path D is discharged to the waste liquid container 1500 through the T-shaped tube S, the discharge flow path E, the solenoid valve SVC, and the discharge flow path F by gravity. At t=5, the solenoid valve SVC becomes closed (non-discharge mode). At this time, a series of waste liquid discharge operations are completed.

In the present embodiment, the duration of the discharge mode was set to 5 seconds with some allowance, but it is sufficient for about 1 second to discharge the waste liquid. Therefore, the timing to close the solenoid valve SVC may be, for example, t=2.0 or t=1.0. In the initialization step described above, this short sequence may be adopted.

In parallel, at t=0.0 to 1.8 in the measurement solution introduction step 13140, a diluted sample liquid prepared in the dilution tank 2110 is introduced into the flow path of the ISEs.

From T=1.8 on in the waste liquid in dilution tank discharge step 13110, the solenoid valves SVA1 to SVA9 become open (suction mode) as described above. In this step, any of the solenoid valves SVA1 to SVA9 corresponding to the dilution tanks to be drained may be appropriately selected. Then, the residual liquid of the sample inside the dilution tank 2110 is sucked into the suction container T1.

At t=2.4, the solenoid valves SVA1 to SVA9 become closed and returned to the non-suction mode, and the suck-in is stopped.

At t=3.5 to 4.6, in the waste liquid in dilution tank discharge step 13210, in the same manner, the solenoid valves SVA1 to SVA9 become open to be in the suction mode. In this step, any of the solenoid valves SVA1 to SVA9 corresponding to the dilution tanks to be drained may be appropriately selected. Therefore, the remainder of the washing liquid inside the dilution tank 2110 is sucked into the suction container T1.

From t=4.6 on in the internal standard liquid dispensing step 13220, the internal standard liquid is dispensed into the dilution tank 2110.

At t=5.6 to 6.0 in the potential measurement step 13160, the potentials of the diluted sample liquid are measured using the ISEs.

At t=6, the sample measurement cycle is completed, and when there is a sample to be measured subsequently, a next internal standard liquid measurement cycle is started.

When there is no sample to be measured subsequently, an operation relevant to the waste liquid discharge mechanism of the shutdown step 15000 is executed. In the shutdown step 15000 which is not shown in the time charts of FIGS. 11 and 12, the above-described waste liquid discharging operation is performed to discharge all waste liquid possibly remaining in the suction container T1. A drive mechanism for the measurement solution suction nozzle 2152 is used to pull up the measurement solution suction nozzle 2152 from the dilution tank 2110. The solenoid valves SVA1 to SVA9 become energized (open, suction mode) to introduce the atmosphere into the suction container T1. In parallel, the exhaust pump 1400 is stopped and energization of the solenoid valve SVD (the resistance tube R and the leak tube N are connected, leak mode) is stopped. About five seconds after the atmosphere is introduced, the V0, V1, and V2 lines almost return to the atmospheric pressure. The solenoid valves SVA1 to SVA9 are returned to be non-energized (closed, non-suction mode), the solenoid valve SVB is closed (non-transfer mode), the solenoid valve SVC is closed (non-discharge mode), and the solenoid valve SVD is connected to the leak tube N (Leak mode). As described above, the operation relevant to the waste liquid discharge mechanism of the shutdown process 15000 is completed.

As described above, the control device 110 performs control such that the suction container T1 is vacuum-exhausted at least while vacuum-exhausting the discharge section (transfer and discharge flow path D) and while releasing the discharge section to the atmosphere. Different from the related art, during the measurement by the measurement unit, the suction container T1 is always in a vacuum state. Therefore, the suction container T1 is always in the vacuum state while vacuum-exhausting the transfer and discharge flow path D and while releasing the transfer and discharge flow path D to the atmosphere. Therefore, the suction container T1 has a unique effect of being able to suck the waste liquid at any desired timing which does not exist in the related art.

The waste liquid discharge method of the present embodiment includes: a step of vacuum-exhausting the suction container T1 by the exhaust pump 1400; a step of sucking a first waste liquid (for example, the remainder of the internal standard liquid) into the suction container T1 from the measurement units 2100, 2200, ..., 2900 (for example, the waste liquid discharge step 13210 of FIG. 11); a step of sucking a second waste liquid (for example, washing liquid) into the suction container T1 from the electrolyte measurement units 2100, 2200, ..., 2900 without releasing the suction container T1 to the atmosphere (for example, the waste liquid discharge step 13110 of FIG. 11); and a step of transferring a mixed liquid of the first waste liquid and the second waste liquid in the suction container T1 to the transfer and discharge flow path D (for example, at time points of 4.7 seconds to 5.4 seconds, the transfer in FIG. 11). Different from the related art, in the present embodiment, the liquid used in a plurality of steps executed in parallel can be sucked freely by the waste liquid discharge mechanism 30 at any desired timing. For example, as described above, the sucking of the first waste liquid and the second waste liquid can be executed continuously without releasing the suction container T1 to the atmosphere. As described above, this effect is obtained from the fact that the suction container T1 is always in a vacuum state.

The above operation was described based on the measurement cycle of the specific electrolyte measurement unit 2100. However, when the other electrolyte measurement units 2200, ..., 2900 are operated in the same phase, and when the other electrolyte measurement units 2200, ..., 2900 are respectively operated out of phase, the inside of the suction container T1 is always kept in the vacuum state of about −80 kPa or less in the waste liquid discharge mechanism 30 according to the present embodiment. Therefore, even when the plurality of electrolyte measurement units is used, there is a unique effect that the waste liquid suction can be performed anytime for any of the electrolyte measurement units. Thereby, it is possible to provide a waste liquid device with high throughput and easy timing design.

The automated analyzer in the present embodiment includes: the plurality of measurement units 2100, 2200, ..., 2900 including the measurement section which measures the sample; the suction container T1 connected to the plurality of measurement units 2100, 2200, ..., 2900 through a first path; the vacuum exhaust system connected to the suction container T1 through a second path; the discharge section connected to the suction container through a third path; and the control device 110 which performs control such that the suction container T1 is vacuum-exhausted by the vacuum exhaust system when performing measurement in the plurality of measurement units 2100, 2200, . . . , 2900. In the present embodiment, the first path includes the waste liquid flow paths A1 to A9. The second path includes the exhaust tubes G, H, and J disposed between the suction container T1 and the exhaust pump 1400. The third path includes the transfer flow path B and the transfer flow path C disposed between the suction container T1 and the transfer and discharge flow path D. The discharge section is a flow path and/or a container which provides a space for temporarily storing the waste liquid, and in the present embodiment, is the transfer and discharge flow path D. In the present embodiment, the pressure adjustment mechanism 1300 is disposed between the exhaust tubes G and H.

Next, the effects of the present embodiment will be described. As is apparent from the above description, in the present embodiment, the inside of the suction container T1 is always kept in the vacuum state of about −80 kPa or less between the completion of the initialization step 11000 and the performance of the shutdown step 15000, in other words, while the internal standard liquid measurement cycle and the sample measurement cycle are alternately and continuously repeated. This also contributes to prevention of air from flowing back to the V1 line through the V0 line by the pressure adjustment mechanism 1300 (check valve) when the V2 line is evacuated from the atmospheric pressure. During the vacuum redrawing of the discharge section (transfer and discharge flow path D), the flowing-back of air from the vacuum exhaust system is prevented by an action of the pressure adjusting mechanism 1300, and the evacuation of the suction container T1 is maintained below a predetermined pressure. Therefore, in the present embodiment, the waste liquid discharge steps 13210 and 13110 from the dilution tank 2110 can be executed at any desired time regardless of the illustrated timing. Therefore, there is a unique effect that timing design is easy and throughput is high when, for example, waste liquid suction is performed from a plurality of units.

In fact, in the present embodiment, a high difficulty sequence was adopted in which the waste liquid in the dilution tank discharge step 13110 in the internal standard liquid measurement cycle and the first step of the waste liquid discharge operation (vacuum of the V2 line) were partially overlapped and executed. However, since the inside of the suction container T1 was always kept in the vacuum state of about −80 kPa or less, the waste liquid suction from the dilution tank 2110 could be performed without any hindrance. In addition, the present embodiment has a unique effect that only one tank is necessary for storing the waste liquid. Therefore, the present embodiment has an effect that the processing capacity per unit installation area is high.

Meanwhile, the related technique (Patent Literature 2) has a problem that there is a period in which a primary vacuum container is released to the atmospheric pressure, and the waste liquid cannot be sucked in this period, and the throughput is low. In addition, in the configuration of Patent Literature 2, two vacuum containers occupying a large volume are necessary, and there is also a problem that the installation area is large. That is, when the present embodiment and the related technique are compared, the present embodiment has effects that the present embodiment is capable of "always" evacuating the waste liquid in a true sense, that the throughput is high, and that the processing capacity per unit installation area is high.

Second Embodiment

Figure 14:
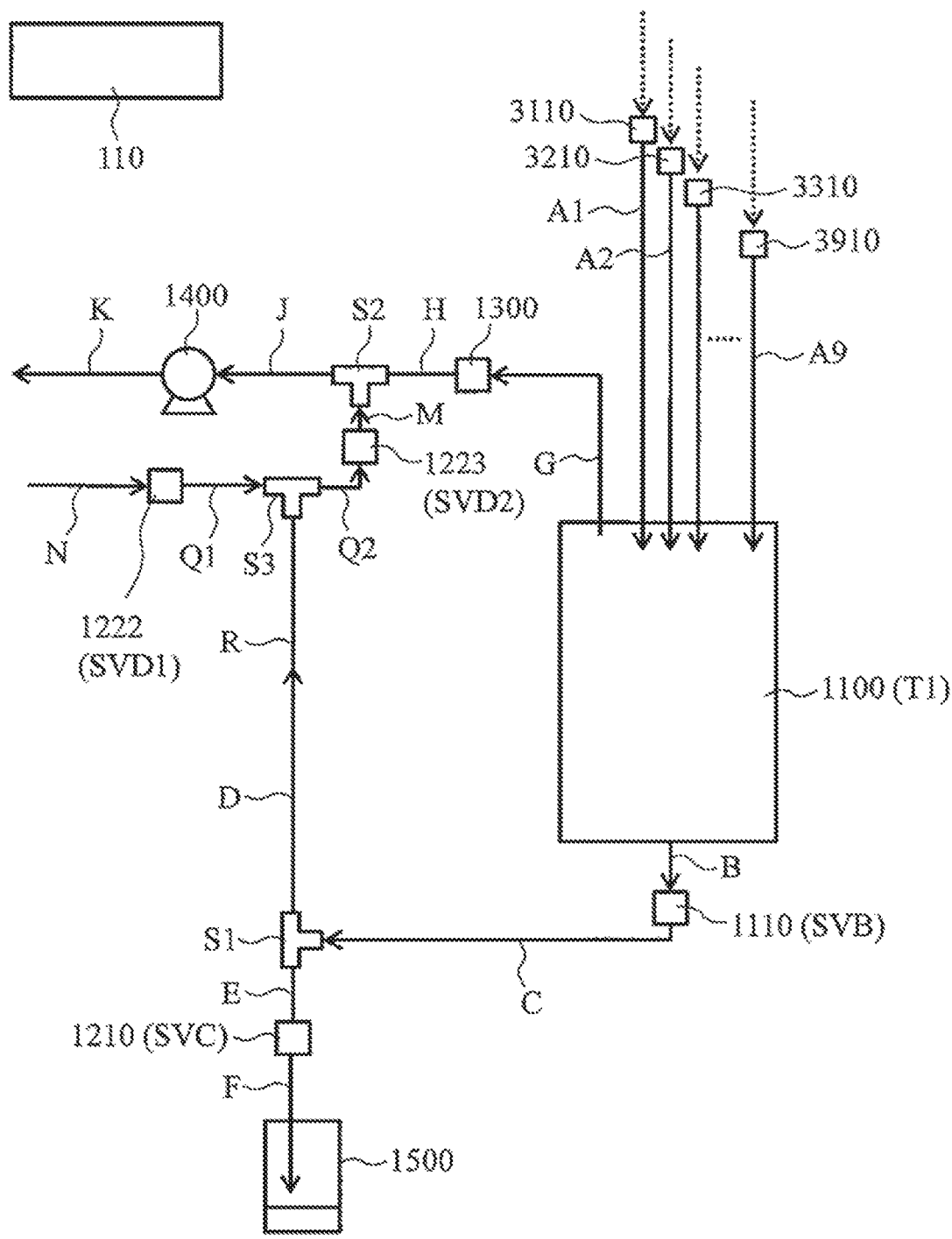
FIG. 14 is a schematic view of a waste liquid discharge mechanism according to a second embodiment.

FIG. 14 is a schematic configuration view of a waste liquid discharge mechanism 30B according to a second embodiment. In the present embodiment, two-way solenoid valves SVD1 (1222) and SVD2 (1223) are used instead of the three-way solenoid valve SVD (1220), and a T-shaped tube S3 and exhaust tubes Q1 and Q2 are used accordingly. When a waste liquid is transferred, exhaust of the V2 line is stopped.

An operation of the present embodiment is basically similar to the operation of the waste liquid discharge mechanism 30 according to the first embodiment, but is different in the following points. In the first embodiment, a step of connecting the three-way solenoid valve SVD to a leak tube N side is changed to a step of opening the two-way solenoid valve SVD1 and closing the two-way solenoid valve SVD2 in the present embodiment. In addition, a step of connecting the three-way solenoid valve SVD to an exhaust tube M side in the first embodiment is changed to a step of closing the two-way solenoid valve SVD1 and opening the two-way solenoid valve SVD2 in the present embodiment. Therefore, the present embodiment exhibits the same functions as those of the first embodiment.

The present embodiment can perform the following operations different from those of the first embodiment. Specifically, in a waste liquid discharge operation, the evacuation of V2 from t=4.3 on is performed so that P2<P1, and then the two-way solenoid valve SVD2 becomes closed in advance from t=4.7 on (before the solenoid valve SVB becomes open to start the transfer mode). If the solenoid valve SVB becomes open and the transfer mode is started immediately after the two-way solenoid valve SVD2 became closed, since the two-way solenoid valve SVD2 is closed, the flow rate of the waste liquid transferred to the transfer and discharge flow path D is controlled, and the linear velocity at which the waste liquid rises inside the transfer and discharge flow path D can be easily controlled. That is, there is a unique effect that the waste liquid can be completely kept inside the transfer and discharge flow path D, and the risk that the waste liquid may be mixed into the V0 line such as the resistance tube R or the solenoid valve SVD can be eliminated.

Third Embodiment

Figure 15:
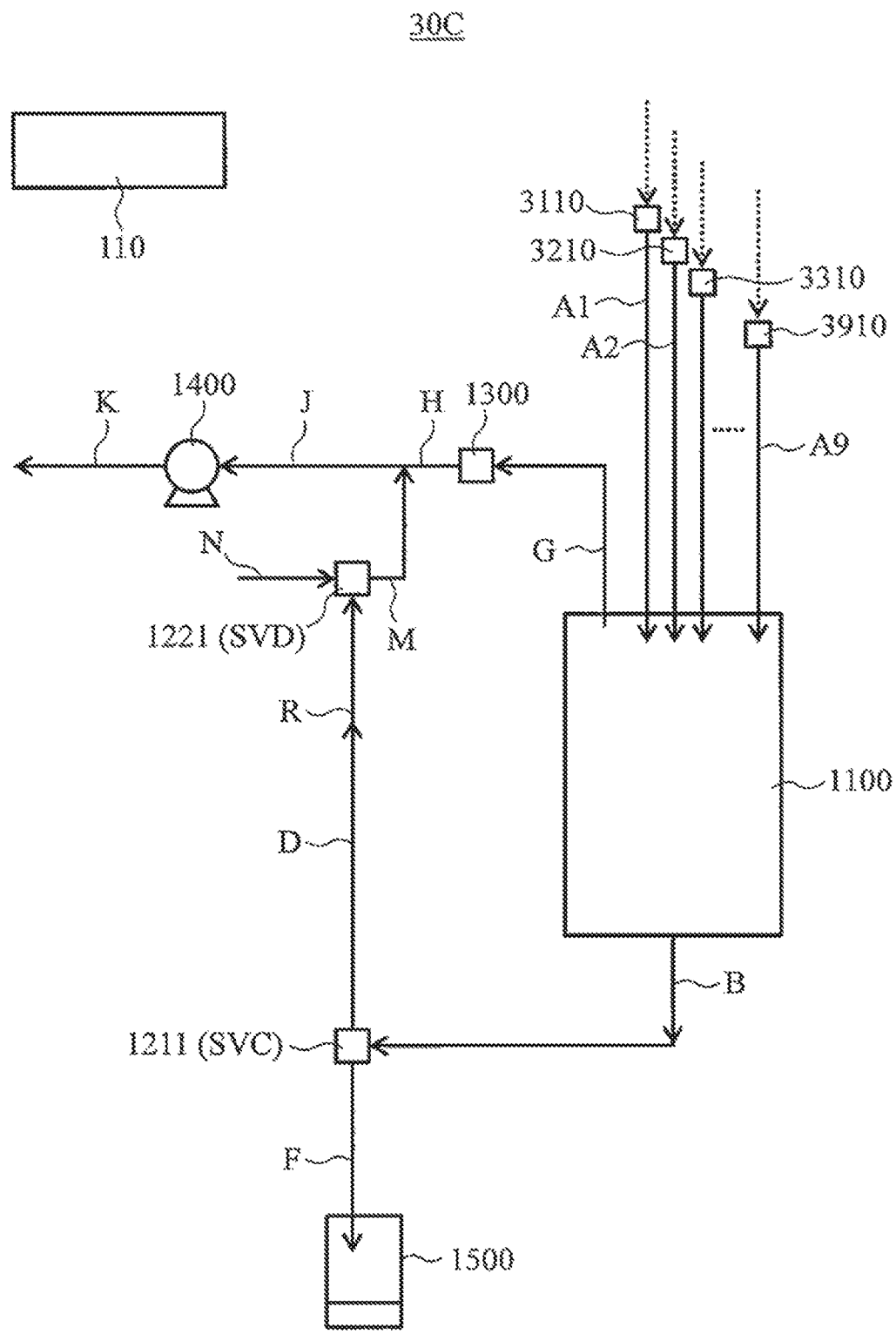
FIG. 15 is a schematic view of a waste liquid discharge mechanism according to a third embodiment.

FIG. 15 is a schematic configuration view of a waste liquid discharge mechanism 30C according to a third embodiment. The configuration of the waste liquid discharge mechanism 30C is similar to that of the waste liquid discharge mechanism 30B according to the second embodiment. However, instead of the (two-way) solenoid valve SVB and the (normal) three-way solenoid valve SVC, an on-off-on type three-way solenoid valve SVC (1211) is used. Also, it is different in the point that the on-off-on type three-way solenoid valve SVD (1221) is used instead of the two-way solenoid valves SVD1 and SVD2. In addition, the present embodiment is different from the second embodiment in that the transfer flow path C, the discharge flow path E, the T-shaped tubes S1 and S3, and the exhaust tubes Q1 and Q2 are omitted. The T-shaped tube S2 is not shown (hereinafter the same, the T-shaped tubes are not shown).

Figure 16:
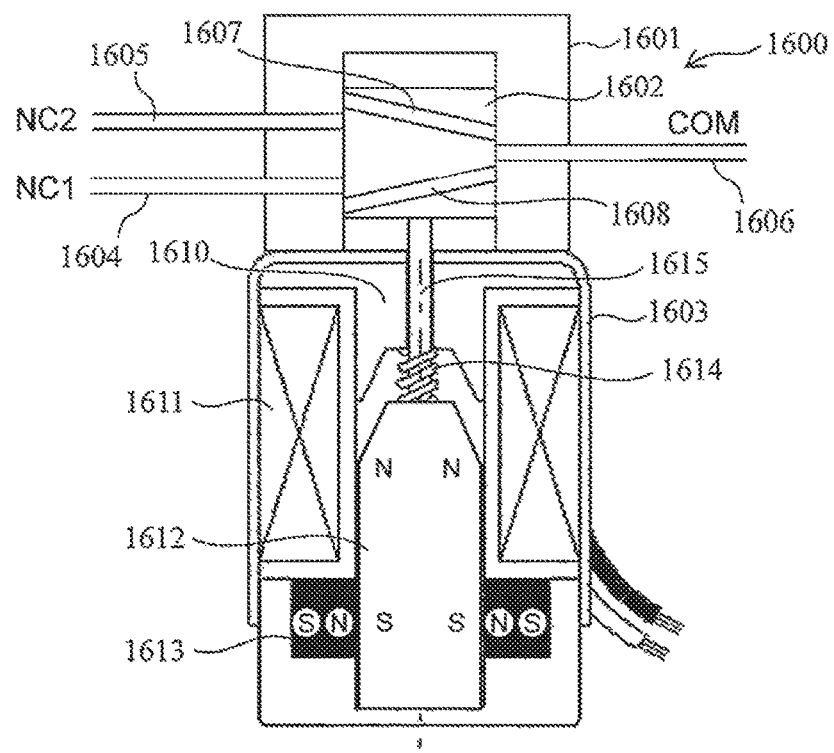
FIG. 16 is a schematic view of an on-off-on type three-way solenoid valve according to the third embodiment.

FIG. 16 is a schematic configuration view of the on-off-on type three-way solenoid valve according to the present embodiment. A three-way solenoid valve 1600 includes a valve seat 1601 having a movable section 1602 and a port switch control section 1603. An NC1 port 1604, an NC2 port 1605, and a COM port 1606 are connected to the valve seat 1601. The movable section 1602 has two flow paths 1607 and 1608. The port switch control section 1603 includes a fixed iron core 1610, a coil 1611, a permanent magnet 1613, and a movable magnetic core 1612 that moves in a vertical direction inside the coil 1611. The movable magnetic core 1612 is connected to the movable section 1602 of the valve seat 1601 through a coupling rod 1615. The movable magnetic core 1612 is attached to the coupling rod 1615 through a spring 1614.

Figure 17A:
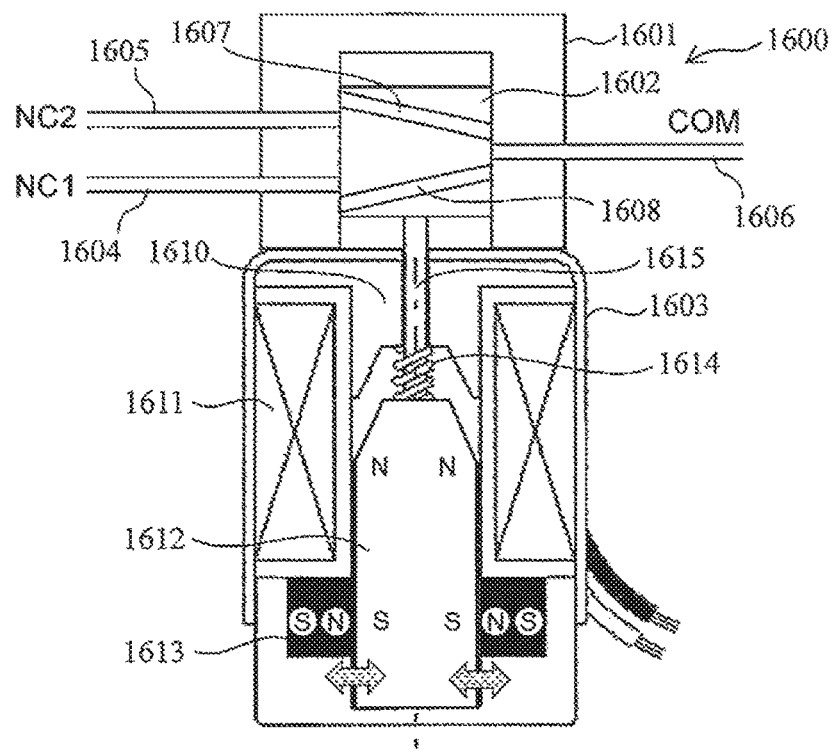
FIG. 17A is a view for illustrating an operation of the on-off-on type three-way solenoid valve in the third embodiment.
Figure 17B:
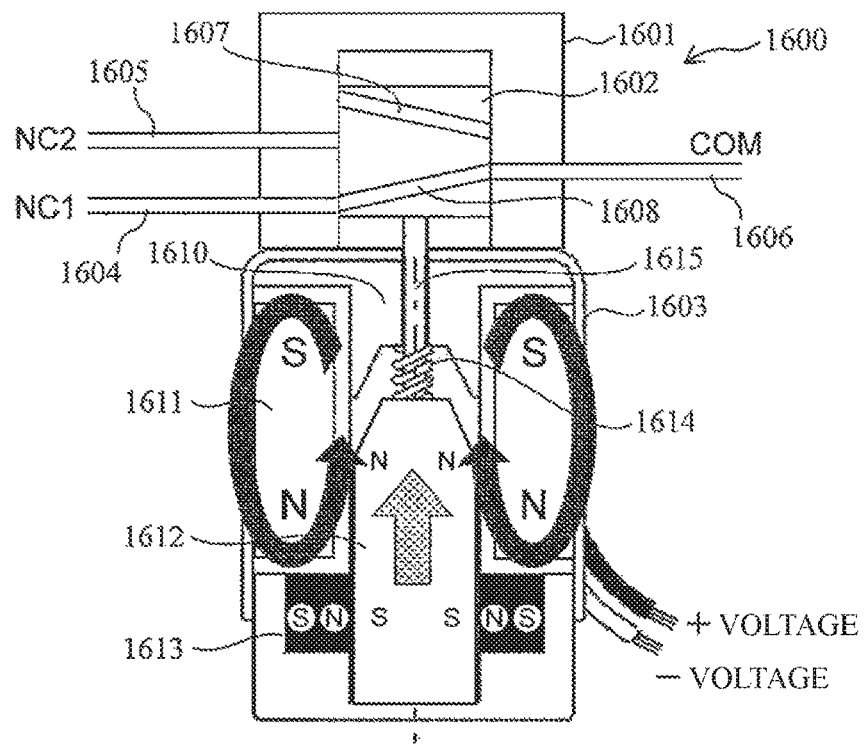
FIG. 17B is a view for illustrating an operation of the on-off-on type three-way solenoid valve in the third embodiment.
Figure 17C:
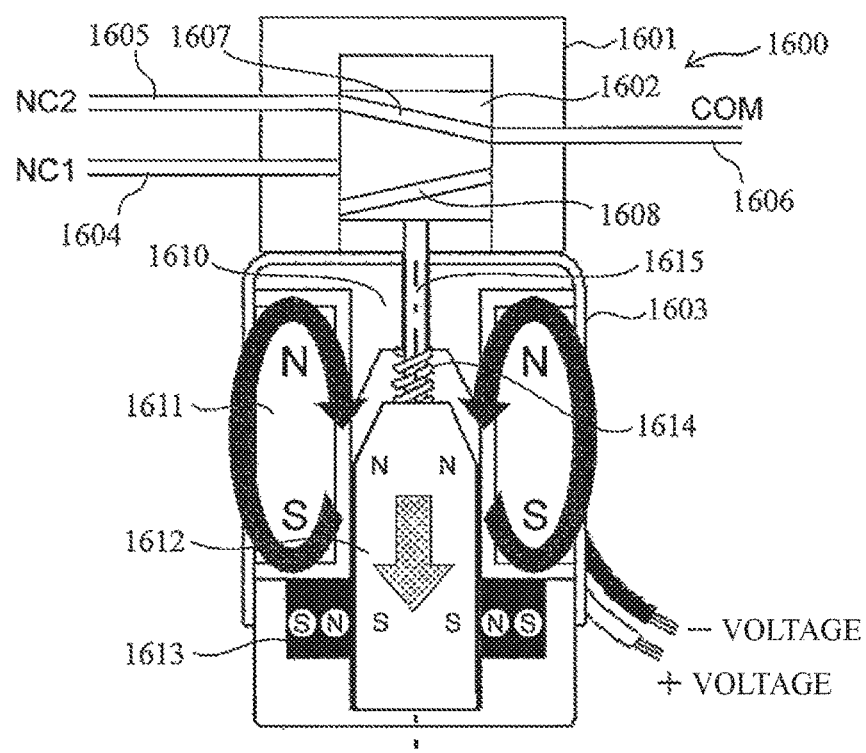
FIG. 17C is a view for illustrating an operation of the on-off-on type three-way solenoid valve in the third embodiment.

FIGS. 17A to 17C are views for illustrating operations of the on-off-on type three-way solenoid valve in the present embodiment. As shown in FIG. 17A, when a current of the coil 1611 is zero, the movable magnetic core 1612 stops at an intermediate point where forces of the permanent magnet 1613 and the spring 1614 are balanced. At this time, the two flow paths 1607 and 1608 of the movable section 1602 of the valve seat 1601 are positioned not to connect any pair of ports among the NC1 port 1604, the NC2 port 1605, and the COM port 1606. That is, the movable section 1602 of the valve seat 1601 has a (midpoint) OFF position.

When the current flows in a first direction of the coil 1611 (a positive current flows), as shown in FIG. 17B, a magnetic force of the coil 1611 overcomes a force of the permanent magnet 1613 and the spring 1614 to cause the movable magnetic core 1612 to move upward in the drawing and stop at a first position. At this time, the flow path 1608 of the movable section 1602 of the valve seat 1601 stops at a position where the COM port 1606 and the NC1 port 1604 are connected. That is, the movable section 1602 of the valve seat 1601 takes the NC1 position.

When the current flows in a second direction of the coil 1611 (a negative current flows), as shown in FIG. 17C, the magnetic force of the coil 1611 overcomes the force of the permanent magnet 1613 to cause the movable magnetic core 1612 to move downward in the drawing and stop at a second position. At this time, the flow path 1607 of the movable section 1602 of the valve seat 1601 stops at a position where the COM port 1606 and the NC2 port 1605 are connected. That is, the movable section 1602 of the valve seat 1601 takes the NC2 position.

In a conventional normal diaphragm-type three-way solenoid valve, the COM port is connected to either NC1 or NC2 corresponding to ON/OFF of the voltage, and a state where the COM port is not connected to either will not be taken. Meanwhile, there is an effect that the on-off-on type three-way solenoid valve 1600 according to the present embodiment takes the midpoint, that is, the OFF position where no voltage is applied, and that a state where the COM port is not connected anywhere can be realized.

The operation of the present embodiment is basically similar to the operation of the waste liquid discharge mechanism 30B according to the second embodiment, but is different in the following points. A step of opening the two-way solenoid valve SVD1 and closing the two-way solenoid valve SVD2 in the second embodiment is changed to a step of connecting the on-off-on type three-way solenoid valve SVD (1221) to the leak tube N side in the present embodiment. A step of closing the two-way solenoid valve SVD1 and opening the two-way solenoid valve SVD2 in the second embodiment is changed to a step of connecting the on-off-on type three-way solenoid valve SVD (1221) to the exhaust tube M side in the present embodiment. A step of closing both the two-way solenoid valve SVD1 and the two-way solenoid valve SVD2 in the second embodiment is changed to a step of setting the on-off-on type three-way solenoid valve SVD (1221) to a midpoint OFF position and blocking the COM port 1606 (connected to the resistance tube R) from any other port in the present embodiment. Therefore, the present embodiment exhibits the same functions as those of the second embodiment.

A step of opening the two-way solenoid valve SVC in the second embodiment is changed to a step of connecting the COM port 1606 (connected to the transfer and discharge flow path D) of the on-off-on type three-way solenoid valve SVC (1211) to a port connected to the discharge flow path F in the present embodiment. A step of opening the two-way solenoid valve SVB in the second embodiment is changed to a step of connecting the COM port 1606 of the on-off-on type three-way solenoid valve SVC (1211) to a port connected to the transfer flow path B in the present embodiment. A step of closing the two-way solenoid valve SVC and the two-way solenoid valve SVB in the second embodiment is changed to a step of setting the COM port 1606 of the on-off-on type three-way solenoid valve SVC (1211) to the midpoint OFF position and blocking the COM port 1606 from any other port in the present embodiment. Therefore, the present embodiment exhibits the same functions as those of the second embodiment.

The present embodiment has a unique effect that the component number of components is small, the installation area is small, and the cost is low. In addition, the present embodiment has a unique effect that the performance per installation area is high.

Fourth Embodiment

Figure 18:
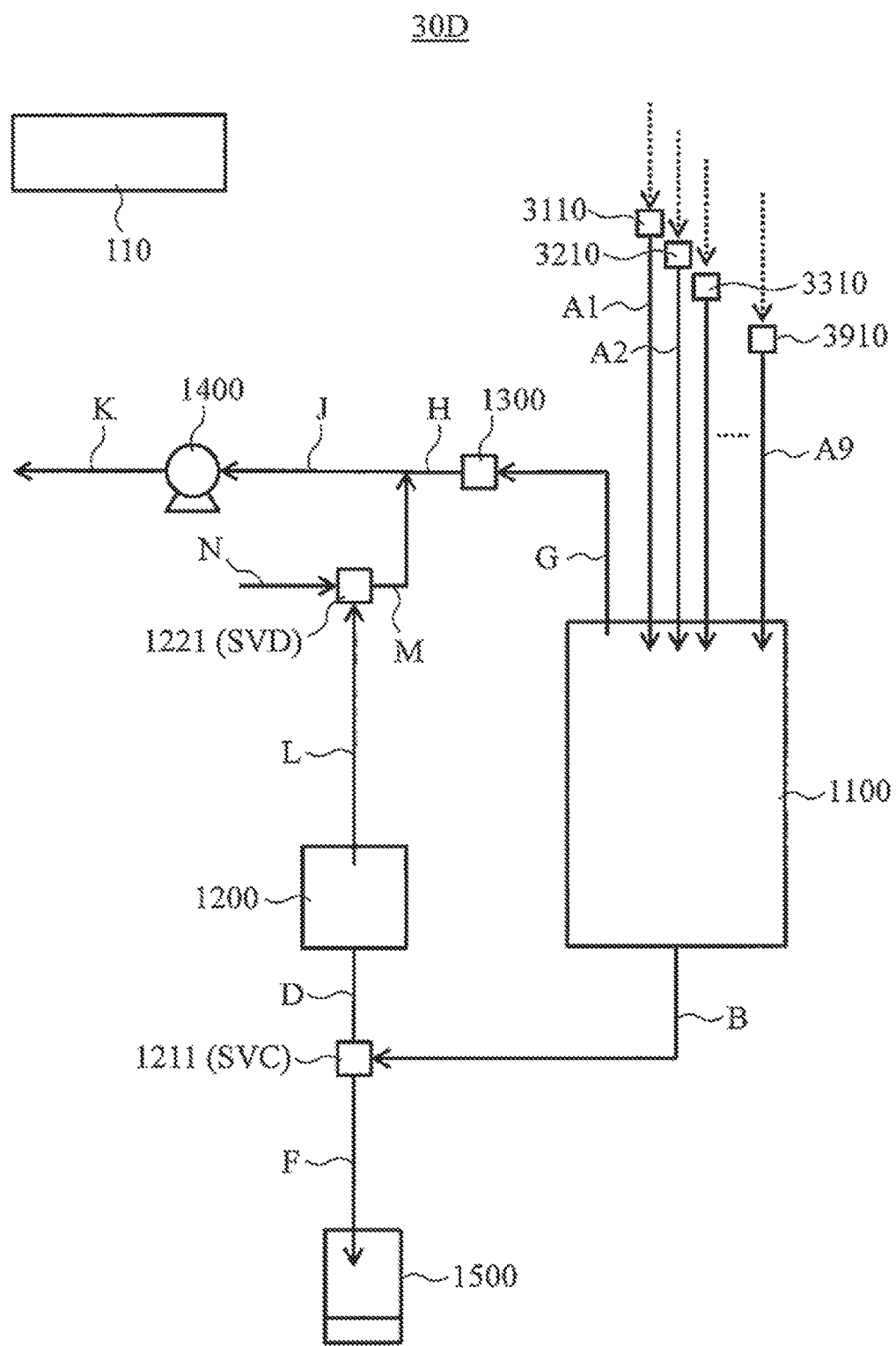
FIG. 18 is a schematic view of a waste liquid discharge mechanism according to a fourth embodiment.

FIG. 18 is a schematic configuration view of a waste liquid discharge mechanism 30D according to a fourth embodiment. The configuration of the waste liquid discharge mechanism 30D is similar to that of the waste liquid discharge mechanism 30C according to the third embodiment, but is different in the point that a discharge member T2 (1200) is provided between the transfer and discharge flow path D and the resistance tube R, and an exhaust tube L is used instead of the resistance tube R. In the present embodiment, a discharge section for temporarily storing the waste liquid is the transfer and discharge flow path D and the discharge member T2.

The discharge member T2 is an airtight member capable of containing the waste liquid inside and includes piping connection ports. The exhaust tube L is connected to an upper end of the discharge member T2, and a transfer and discharge flow path D is connected to a lower end of the discharge member T2. As the discharge member T2, a container having a bottom area similar to that of the suction container T1 and a height smaller than that of the suction container T1 can be adopted. As the discharge member T2, a tube, a piping, or a pipe may be adopted.

The operation of the present embodiment is similar to that of the third embodiment, but is different in the point that, in the transfer mode of the waste liquid discharge operation, the waste liquid is transferred by pressure to the transfer and discharge flow path D, and then passes through the transfer and discharge flow path D to be transferred by pressure to the discharge member T2. When comparing an inner volume of the discharge member T2 with an inner volume of the transfer and discharge flow path D, since the inner volume of the discharge member T2 is several times to several hundred times larger than the inner volume of the transfer and discharge flow path D, there is a unique effect that a large amount of waste liquid can be retained.

Since it is necessary to discharge a relatively large amount of air when exhausting an inside of the discharge member T2, by using the exhaust tube L instead of the resistance tube R, flow resistance of air is reduced and time required for exhausting is shortened.

In the waste liquid discharge mechanism 30D according to the present embodiment, since a large amount of waste liquid can be retained in the discharge member T2, there is a unique effect that the processing capacity per cycle of the waste liquid discharge operation is high, and processing of a large amount of waste liquid generated when a large number of electrolyte measurement units are provided can also be easily coped with. There is a unique effect that it can be easily applied not only to the electrolyte measurement units, but also to other applications in which a suction removal of a large amount of waste liquid is necessary, such as a colorimetric unit described below.

Fifth Embodiment

Figure 19:
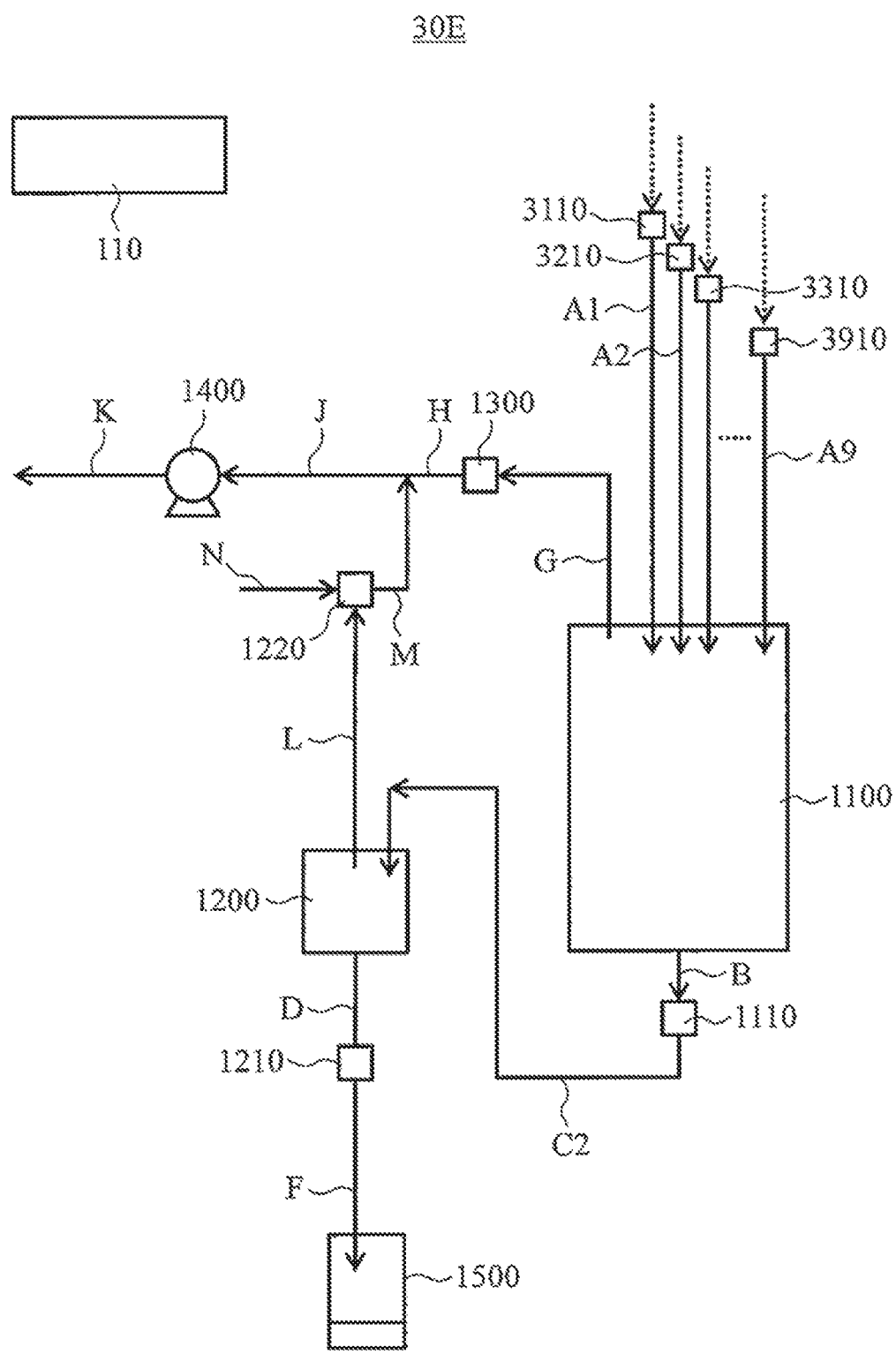
FIG. 19 is a schematic view of a waste liquid discharge mechanism according to a fifth embodiment.

FIG. 19 is a schematic configuration view of a waste liquid discharge mechanism 30E according to a fifth embodiment. The configuration of the waste liquid discharge mechanism 30E is similar to that of a combination of the waste liquid discharge mechanism 30 according to the first embodiment and the waste liquid discharge mechanism 30D according to the fourth embodiment, but is different in the point that a transfer flow path C2 having one end connected to an upper portion of the discharge member T2 is used as a transfer flow path for the waste liquid. An installation height of the discharge member T2 is preferably lower than an installation height of the suction container T1.

The operation of the present embodiment is similar to the operation of the fourth embodiment, but is different in the points that, in the transfer mode of the waste liquid discharge operation, the waste liquid is transferred by pressure directly from the transfer flow path C2 to the discharge member T2 not through the transfer and discharge flow path D, and the waste liquid is ejected downward from vertically above inside of the discharge member T2. Since a velocity vector of the waste liquid is basically vertically downward, it is difficult for droplets or the like to wrap around into the exhaust tube L in which a vertically upward inlet is disposed. Therefore, there is a unique effect that there is very little risk of the V2 line and hence the V0 line being contaminated by the waste liquid. This risk can also be further reduced by providing a barrier such as a baffle plate inside the discharge member T2.

Sixth Embodiment

Figure 20:
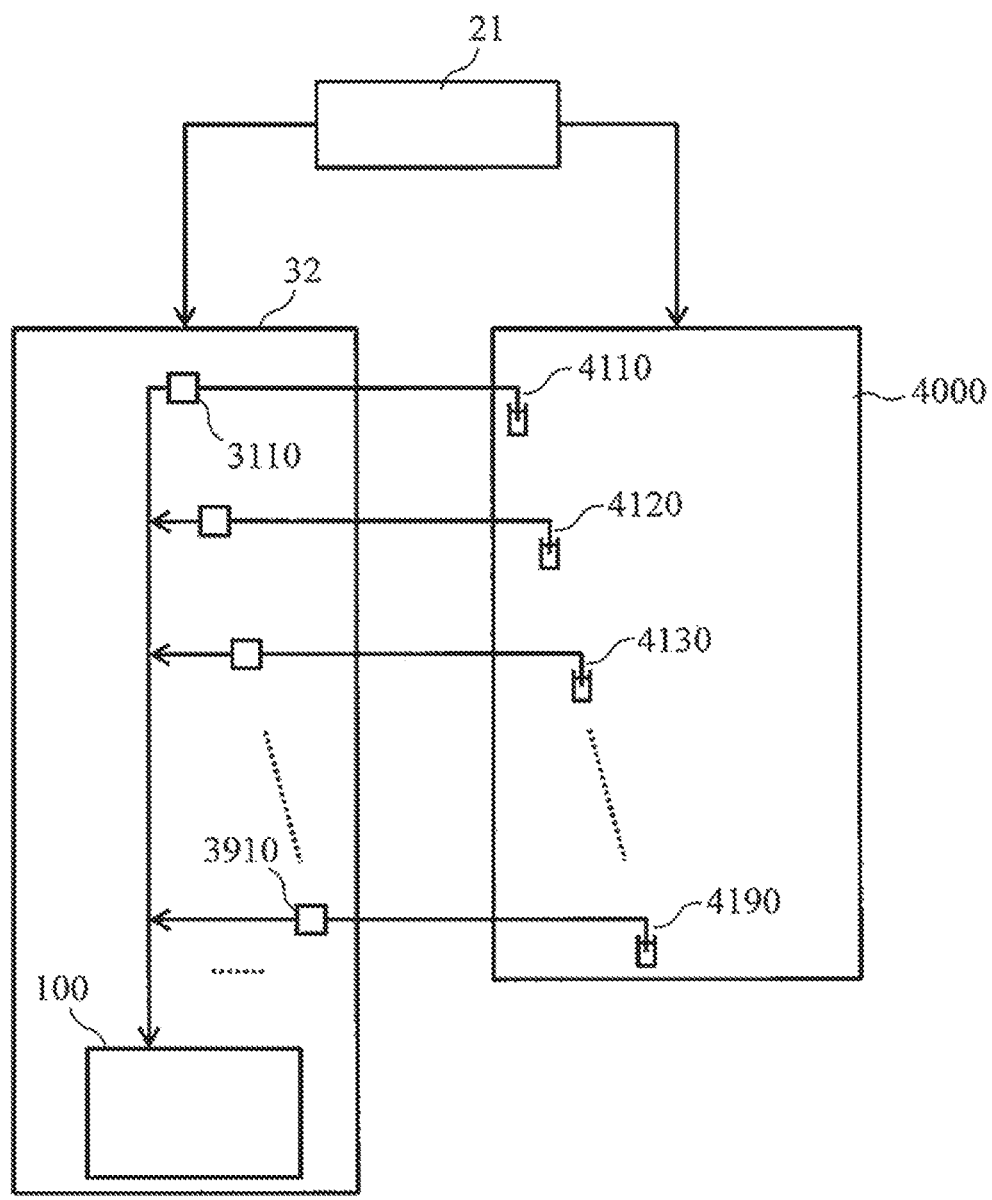
FIG. 20 is a schematic view of an automated colorimetric analyzer according to a sixth embodiment.

FIG. 20 is a schematic configuration view of an automated colorimetric analyzer 40 according to a fifth embodiment. The automated colorimetric analyzer 40 includes a central control device 21, a waste liquid discharge mechanism 32, and a colorimetric measurement unit 4000. The colorimetric measurement unit 4000 includes a plurality of photometric cells (not shown), waste liquid nozzles 4110 to 4190, and drive mechanisms (not shown) for waste liquid nozzles 4110 to 4190.

The waste liquid nozzles 4110 to 4190 are connected to the central portion 100 of the waste liquid discharge mechanism 32 through the solenoid valves SVA1 (3110) to SVA9 (3910). FIG. 20 illustrates 9 photometric cells and 9 waste liquid nozzles, but an automated colorimetric analyzer including tens to hundreds photometric cells or more and ten waste liquid nozzles or more has been put to practical use.

Next, an outline of the operation of the present embodiment will be illustrated. The automated colorimetric analyzer 40 dispenses a sample into an inside of each photometric cell, thereafter, adds a reagent, causes reaction, causes a color, and quantifies a concentration of a target component in the sample by the change in absorbance. After the measurement is ended, a washing step is executed. Specifically, first, a washing liquid is injected into the photometric cell using a washing liquid injection mechanism (not shown) to perform washing. The washing liquid (waste liquid) after washing is discharged using the waste liquid nozzles 4110 to 4190 as schematically shown in FIG. 20. After washing with the washing liquid, the photometric cell is washed using pure water in the same manner. Lastly, a small amount of the pure water remaining in each of the photometric cells is discharged using the waste liquid nozzles 4110 to 4190. After the above washing step is completed, the photometric cell is again subjected to measurement of the sample. The above operation is automatically performed by the central control device 21 under an instruction of the user.

A specific operation of discharging the washing liquid or the pure water from the photometric cell is the same as that in other embodiments, and the waste liquid is vacuum-suctioned into an inside of the waste liquid discharge mechanism 32 including a vacuum mechanism. Finally, the waste liquid is discharged to a waste liquid drainage. In the present embodiment, as the waste liquid discharge mechanism 32, one that is equivalent to the waste liquid discharge mechanism 30E described in the fifth embodiment is adopted.

Since the waste liquid discharge mechanism 32 according to the present embodiment can vacuum-suction the waste liquid at any timing during the measurement cycle, there is a unique effect that the degree of freedom of setting an operation sequence of the automated colorimetric analyzer is high, and consequently the measurement can be performed with high throughput. In particular, this effect is more remarkably exhibited in a latest automated colorimetric analyzer in which the cycle time is shortened to a limit. A colorimetric measurement system of a biochemical automated analyzer to which the waste liquid discharge mechanism according to the disclosure is applied has a wide range of operation timing, and has a unique effect of high throughput because the sequence can be flexibly assembled.

Effects of a plurality of embodiments described above will be described below. A first configuration of the automated analyzer includes: a plurality of measurement units including a measurement section which measures a sample; a suction container connected to the plurality of measurement units through a first path; a vacuum exhaust system connected to the suction container; a discharge section connected to the suction container; and a control section which performs control such that the suction container is always vacuum-exhausted by the vacuum exhaust system when performing measurement in the plurality of measurement units.

Since the above-described configuration includes the suction container always maintained in a vacuum state, there is an effect that waste liquid suction from the plurality of measurement units can be performed anytime by using a single waste liquid discharge mechanism. Therefore, even when a large number of measurement units are included, since only one waste liquid discharge mechanism is required, there is an effect that the occupied area can be reduced and the throughput per installation area can be improved. In addition, in some embodiments described above, only one suction container is necessary. Therefore, there is an effect that the number of components can be reduced, and maintenance effort and time can be reduced, and the cost is also low.

In a second configuration of the automated analyzer, while the waste liquid is stored in the suction container, the discharge section is connected to the vacuum exhaust system, and the vacuum exhaust is performed. In addition, while the waste liquid is discharged from the discharge section, the discharge section and the vacuum exhaust system are blocked from each other, and the discharge section is released to the atmosphere.

Ina third configuration of the automated analyzer, the first path is connected to the plurality of measurement units through respective valves. While a predetermined measurement unit and the first path are connected by the valve, the other valve connecting the other measurement unit and the first path is controlled to be closed.

In a fourth configuration of the automated analyzer, while the waste liquid is discharged from the discharge section, the valve provided between the suction container and the discharge section is closed.

In a fifth configuration of the automated analyzer, a lower portion of the suction container and a lower portion of the discharge section are connected through an on-off-on type three-way valve.

The application range of the disclosure is widely applicable not only to the automated analyzer based on the principle of potentiometric measurement (ion selective electrode) and colorimetric (absorbance analysis), but also to the automated analyzer including a mechanism for discharging the waste liquid by evacuation, such as a latex agglutination analyzer based on turbid metric or scattered light intensity and an immune analyzer based on antigen-antibody reaction.

The disclosure is not limited to the embodiments described above, and includes various modifications. The above embodiments are described in detail in an easy-to-understand manner, and are not necessarily limited to those having all the configurations described. In addition, partial configuration of one embodiment may be replaced with the configuration of another embodiment. In addition, the configuration of another embodiment can be added to the configuration of one embodiment. In addition, with respect to partial configuration of each embodiment, other configurations can be added, deleted, or replaced.

The functions of the control device, the measurement control device, etc. described above may be realized in software by a processor that interprets and executes programs that realize the respective functions. Information such as programs and files for realizing each function can be stored in a memory, a hard disk, a recording device such as a solid state drive (SSD), or a recording medium such as an IC card, an SD card, or a DVD. In addition, each of the above configurations may be realized in hardware by designing part or all of them, for example, with an integrated circuit.

In the above-described embodiment, control lines and information lines show what is considered necessary for the illustration, and not all the control lines and the information lines in the product are necessarily shown. All configurations may be connected to each other.

All publications and patent literatures cited in the description are hereby incorporated in the description by reference as it is.

REFERENCE SIGN LIST

10: automated electrolyte analyzer
20, 21: central control device
30, 30B, 30C, 30D, 30E, 30F, 31, 32: waste liquid discharge mechanism
40: automated colorimetric analyzer
100: central portion of waste liquid discharge mechanism
110: control device
1100: suction container T1
1110: solenoid valve SVB
1200: discharge member T2
1210, 1211: solenoid valve SVC
1220, 1221: solenoid valve SVD
1222, 1223: solenoid valve SVD1, SVD2
1300: pressure adjustment mechanism
1400: exhaust pump
1500: waste liquid container
1600: three-way solenoid valve
1601: valve seat
1602: movable section
1603: port switch control section
1604, 1605, 1606: port
1607, 1608: flow path
1610: fixed iron core
1611: coil
1612: movable magnetic core
1613: permanent magnet
1614: spring
1615: coupling rod
2100, 2200, . . . , 2900: electrolyte measurement unit
2101: measurement control device
2110: dilution tank
2120: sample dispensing mechanism
2121: container for sample
2130: diluent dispensing mechanism
2131: container for diluent
2140: internal standard liquid dispensing mechanism
2141: container for internal standard liquid
2150: liquid feeding mechanism
2159: waste liquid container
2160: reference electrode liquid feeding mechanism
2161: container for reference electrode liquid
2171, 2172, 2173: Cl-ISE, K-ISE, Na-ISE
2180: liquid junction
2190: reference electrode
3101, . . . , 3901: waste liquid nozzle
3110, . . . , 3910: solenoid valve SVA1 to SVA9
4000: colorimetric measurement unit
4110 to 4190: waste liquid nozzle
A1 to A9, A10: waste liquid flow path
B: transfer flow path
C, C2: transfer flow path
D: transfer and discharge flow path
E: discharge flow path
F: discharge flow path
G: exhaust tube
H: exhaust tube
J: exhaust tube
K: exhaust tube
L: exhaust tube
L2: resistance tube
M: exhaust tube
N: leak tube
Q1, Q2: exhaust tube
R: resistance tube
S1, S2, S3: T-shaped tube

The invention claimed is:
1. An automated analyzer, comprising:
a plurality of measurement units including a measurement section which measures a sample;
a suction container connected to each of said plurality of measurement units through a corresponding one of a plurality of first paths;

a vacuum exhaust system connected to the suction container through a second path;
a discharge section connected to the suction container through a third path;
a pressure adjustment mechanism disposed in the second path; and
a control section configured to perform control such that the suction container and the discharge section are vacuum-exhausted by the vacuum exhaust system, wherein
the discharge section comprises at least one of a flow path and a container which provides a space for temporarily storing a waste liquid,
an end of the pressure adjustment mechanism is connected to the suction container and another end of the pressure adjustment mechanism is connected to the vacuum exhaust system,
the discharge section is connected to the vacuum exhaust system through a fourth path,
the control section is configured to vacuum-exhaust the discharge section by controlling the vacuum exhaust system,
a valve body having a state to block a flow path is provided in each of said plurality of first paths, and
during the vacuum-exhausting of the discharge section, the control section is configured to control the pressure adjustment mechanism to prevent fluid flow between the suction container and the vacuum exhaust system such that an inside of the suction container is maintained in a constant vacuum state.

2. The automated analyzer according to claim 1, wherein the pressure adjustment mechanism is a check valve, a solenoid valve, or a pressure regulator.

3. The automated analyzer according to claim 1, further comprising:
a first valve which is disposed in the first path and controls the connection between the measurement units and the suction container;
a second valve which is disposed between the discharge section and the vacuum exhaust system, and switches the connection between the discharge section and the vacuum exhaust system and the atmospheric release of the discharge section; and
a third valve which is disposed in the third path and controls the connection between the suction container and the discharge section.

4. The automated analyzer according to claim 3, wherein the control section is further configured to
connect the discharge section to the vacuum exhaust system through the second valve while sucking a waste liquid into the suction container through the first valve;
connect the suction container and the discharge section through the third valve while vacuum-exhausting the discharge section by the vacuum exhaust system; and
block the connection between the suction container and the discharge section by the third valve, and also release the discharge section to the atmosphere by the second valve.

5. The automated analyzer according to claim 3, wherein the control section is further configured to control the pressure adjustment mechanism such that before the suction container and the discharge section are connected through the third valve, a difference between a first pressure on the suction container side and a second pressure on the discharge section side becomes about 1 kPa to 30 kPa.

6. The automated analyzer according to claim 1, wherein the control section is further configured to control the pressure adjustment mechanism such that when the discharge section is vacuum-exhausted by the vacuum exhaust system in a waste liquid discharge operation, an air pressure in the discharge section is lower than an air pressure in the suction container.

7. The automated analyzer according to claim 1, wherein
the automated analyzer further comprises a three-way solenoid valve disposed in the third path, and
the three-way solenoid valve includes
a first port, a second port, and a third port connected to the first port or the second port,
a movable section having a first flow path and a second flow path, and
a port switch control section including a coil, a magnet, and a movable magnetic core which moves inside the coil and is connected to the movable section, and
wherein the three-way solenoid valve is configured such that
when an electric current is made to flow through the coil in a first direction, the first port and the third port are connected through the first flow path,
when an electric current is made to flow through the coil in a second direction, the second port and the third port are connected through the second flow path, and
when an electric current is not made to flow through the coil, the third port is not connected to either of the first port and the second port.

8. The automated analyzer according to claim 1, wherein an installation height of the discharge section is lower than an installation height of the suction container.

9. The automated analyzer according to claim 1, wherein
the control section is further configured to perform control each said valve body provided in each of said plurality of first paths such that when a given measurement unit among the plurality of measurement units is connected to one of said first paths through the corresponding valve body, the other valve bodies provided in the other first paths connecting the other measurement units among the plurality of measurement units to the other first paths are closed.

10. An automated analyzer, comprising:
a plurality of measurement units including a measurement section which measures a sample;
a suction container connected to the plurality of measurement units through a first path;
a vacuum exhaust system connected to the suction container through a second path;
a discharge section connected to the suction container through a third path; and
a control section configured to control the exhaust system such that the suction container is vacuum-exhausted by the vacuum exhaust system when performing measurement in the plurality of measurement units, wherein
the control section is configured to control the exhaust system such that the suction container is vacuum-exhausted at least while vacuum-exhausting the discharge section and while releasing the discharge section to the atmosphere by
connecting the discharge section to the vacuum exhaust system such that the discharge section is vacuum-exhausted by the vacuum exhaust system while sucking a waste liquid into the suction container;
connecting the suction container to the discharge section, and the waste liquid is transferred to the discharge section, and after the waste liquid is transferred to the discharge section, blocking the connection between the suction container and the discharge section and the connection between the vacuum exhaust system and the discharge section, and releasing the discharge section to the atmosphere, such that an inside of the suction container is maintained in a constant vacuum state.

11. A liquid discharge method for an automated analyzer, the automated analyzer including a plurality of measurement units including a measurement section that measures a sample;

a suction container connected to each of said plurality of measurement units through a corresponding one of a plurality of first paths;

a vacuum exhaust system connected to the suction container through a second path;

a discharge section connected to the suction container through a third path; and a pressure adjustment mechanism disposed in the second path, wherein the discharge section comprises at least one of a flow path and a container which provides a space for temporarily storing a waste liquid, an end of the pressure adjustment mechanism is connected to the suction container and another end of the pressure adjustment mechanism is connected to the vacuum exhaust system, the discharge section is connected to the vacuum exhaust system through a fourth path, the control section is configured to vacuum-exhaust the discharge section by controlling the vacuum exhaust system, a valve body having a state to block a flow path is provided in each of said plurality of first paths, the method comprising:

a step of vacuum-exhausting the suction container and the discharge section by the vacuum exhaust system;

a step of sucking a first waste liquid into the suction container from the measurement units;

a step of sucking a second waste liquid into the suction container from the measurement units without releasing the suction container to the atmosphere; and a step of transferring a mixed liquid of the first waste liquid and the second waste liquid in the suction container to the discharge section, wherein during the vacuum-exhausting of the discharge section, the pressure adjustment mechanism is configured to prevent fluid flow between the suction container and the vacuum exhaust system such that an inside of the suction container is maintained in a constant vacuum state.

* * * * *